United States Patent [19]
Lee

[11] Patent Number: 5,798,670
[45] Date of Patent: Aug. 25, 1998

[54] ACTIVE FILTER CIRCUIT

[75] Inventor: Thomas A. Lee, Apple Valley, Minn.

[73] Assignee: Itron, Inc., Lakeville, Minn.

[21] Appl. No.: 863,412

[22] Filed: May 27, 1997

Related U.S. Application Data

[60] Continuation-in-part of Ser. No. 814,371, Mar. 11, 1997, which is a division of Ser. No. 638,794, Apr. 29, 1996.

[51] Int. Cl.$^6$ .................................................... H03B 1/00
[52] U.S. Cl. ............................ 327/552; 327/559; 327/554
[58] Field of Search ............................. 327/551, 552, 327/554, 559, 336, 337, 344, 91, 94, 96

[56] References Cited

U.S. PATENT DOCUMENTS

| | | | |
|---|---|---|---|
| 4,097,732 | 6/1978 | Krause et al. | 250/205 |
| 4,429,281 | 1/1984 | Ito et al. | 327/554 |
| 4,524,326 | 6/1985 | Larson | 327/105 |
| 4,578,646 | 3/1986 | Maio et al. | 327/307 |
| 4,620,094 | 10/1986 | Tani et al. | 250/231 |
| 4,649,267 | 3/1987 | Ray | 250/205 |
| 4,712,000 | 12/1987 | Yoshikawa et al. | 250/205 |
| 5,015,836 | 5/1991 | Van Antwerp | 250/205 |
| 5,132,527 | 7/1992 | Karpati | 250/205 |
| 5,248,879 | 9/1993 | Turvy, Jr. | 250/205 |
| 5,270,529 | 12/1993 | Shudo | 250/205 |
| 5,281,860 | 1/1994 | Krenik et al. | 327/91 |
| 5,302,944 | 4/1994 | Curtis | 340/653 |
| 5,406,267 | 4/1995 | Curtis | 340/653 |

*Primary Examiner*—Toan Tran
*Attorney, Agent, or Firm*—Kinney & Lange, P.A.

[57] ABSTRACT

A rotating surface optical sensing system having a radiation source controlled by a controlled current generator to emit electromagnetic radiation toward the rotating surface from which it can be directed to a radiation detector to provide corresponding signals to a threshold detector. The controlled current generator uses the threshold detector indications as to whether these signals are beyond a threshold value if validated by a rotation determiner noting rotations of the rotating surface to set the current for the radiation source. An amplifying filter is provided to amplify selected frequency components of the radiation detector output signals as a bandpass filter having a lower cutoff frequency such that relatively slowly varying optical ambient based signals are not amplified but signals from the radiation source directed from the surface to the detector are amplified. This is accomplished by repeatedly sampling the radiation detector output signals when the radiation source is not emitting, and again when it is emitting, and subtracting corresponding ones of such samples followed by integrating the differences so determined. Power supply noise occurring during emissions by the radiation source can be decoupled from the filter.

6 Claims, 9 Drawing Sheets

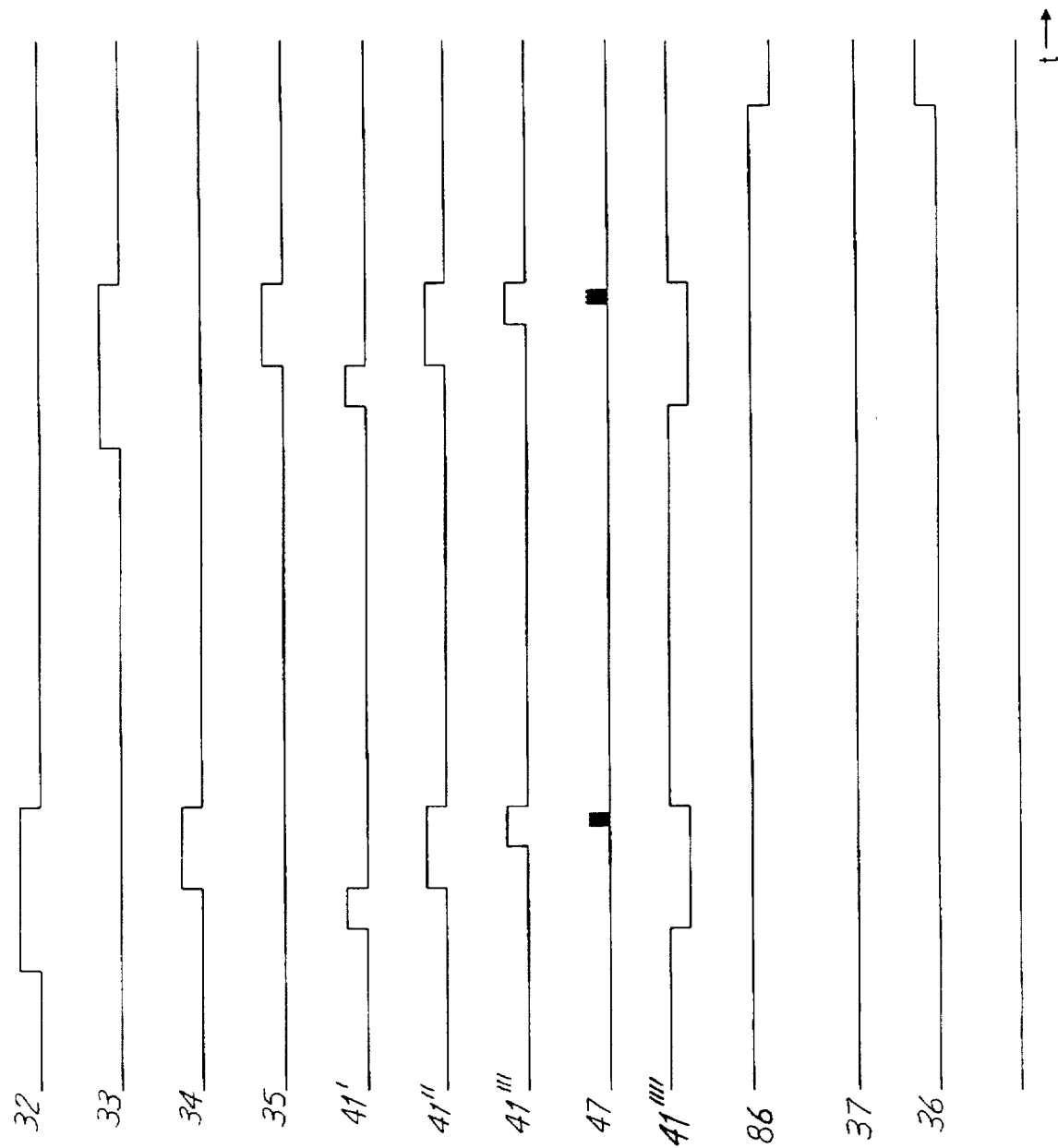

5,798,670

ACTIVE FILTER CIRCUIT

CROSS-REFERENCE TO RELATED APPLICATIONS

This application is a continuation-in-part of U.S. application Ser. No. 08/814,371, filed Mar. 11, 1997, which is a division of U.S. application Ser. No. 08/638,794, filed Apr. 29, 1996.

BACKGROUND OF THE INVENTION

This invention relates to rotation monitors for monitoring rotations of a rotatable element and, more particularly, for countering changes in conditions or disturbances related to such a rotation monitor during its operation. Rotation measurement devices of various kinds have been used for monitoring the motion of rotating elements through detecting change or changes in one or more parameters characterizing the motion of such rotating element during rotations thereof. In one kind of arrangement based on detection of optical parameter changes, such a rotating element has a relatively large electromagnetic radiation reflectance surface portion and a relatively low electromagnetic radiation reflectance surface portion both encountered along a circular concentric band therein to provide detectable optical parameter changes during each rotation. Alternatively, the surface may instead have an electromagnetic radiation transmissive portion and a radiation nontransmissive portion encountered along that circular band to provide the desired detectable optical parameter changes.

One well known device in which there is a desire to monitor rotations of a rotating member is an electric power meter, or watt-hour meter, which has a rotating disk, or eddy wheel, which is often arranged to rotate about a vertical axis and so in a horizontal plane during use. Since the meter is constructed to have the rotations of this eddy wheel proportional to the electrical power consumed, the number of rotations must be counted as a measure of that power consumption. Rotation monitors provided for this purpose can accomplish this monitoring by emitting electromagnetic radiation to impinge on a circular concentric band on the surface on one side of the wheel which is substantially reflective of such radiation therealong except where interrupted by a low reflective marking. The emitted radiation is reflected from the band during rotation of the wheel, except from the low reflectivity mark or except from an alternative opening in the wheel, to a photodetector on that side of the wheel. Alternatively, such electromagnetic radiation can be emitted on one side of such a wheel to impinge on a circular concentric band in the facing surface thereof, which is opaque except where one or more openings are provided in the wheel along the band, this radiation to be detected by a photodetector on the opposite side of the wheel whenever such openings pass between the emitter and the detector.

The resulting electrical signals from the photodetector output have varying magnitudes therein with larger values corresponding to the times when such electromagnetic radiation is detected and lower values corresponding to those times when it is not detected. This output signal is provided to signal processing circuitry to obtain from these varying magnitudes the number of rotations of the disk, and so the amount of electrical power consumed. The use of an additional emitter at a location differing from the first emitter, or of an additional photodetector at a location differing from the first photodetector, permits determining not only the number of rotations of the eddy wheel but also the direction of such rotations which is useful in those situations in which power from the load is transmitted back to the source or in which some kinds of physical tampering with the metering system are desired to be detected. Such information derived by the signal processing circuitry may be further communicated to remote locations using suitable communication techniques.

One such meter system monitor uses two light emitting diodes (LED's) capable of emitting electromagnetic radiation in the near infrared portion of the spectrum with such emitted radiation being reflected from the meter eddy wheel to a photodetector is located approximately between these emitters to receive same. A view of such an arrangement is shown in FIG. 1 in which a housing, 10, has the two LED's, 11 and 12, housed therein so as to be capable of directing infrared electromagnetic radiation emitted therefrom along corresponding paths, 13 and 14, shown in dashed lines, to a surface, 15, on a side of an eddy wheel, 16, of which a portion is shown. Surface 15 is supported and rotated with respect to LED's 11 and 12 so as to have a circular concentric band therein continually intercepting paths 13 and 14 during rotations of wheel 16 from which surface band the emitted radiation is substantially reflected except at a low reflectivity mark, 17, positioned across a portion of that band. Housing 10 also houses a photodetector, 18, which receives much of any such reflected infrared electromagnetic radiation from emitters 11 and 12 over corresponding return paths, 19 and 20, also shown in dashed lines beginning from the same circular concentric band.

An operation controller and signal processing system, 21, receives the electrical signals corresponding to the reflected electromagnetic radiation impinging on photodetector 18 over an interconnection path, 22. This system is also coupled to LED's 11 and 12 over corresponding interconnections, 23 and 24, to permit the controller therein to cause them to emit infrared electromagnetic radiation pulses in a sequence over time formed by the repeating pulse pattern at a repetition rate sufficient to detect the passage of low reflectivity mark 17 at the maximum rotation rate of the wheel. LED's 11 and 12 are directed to emit such pulses of electromagnetic radiation by supplying corresponding pulsed currents thereto over interconnections 23 and 24 from operation and processing system 21. Photodetector 18 provides electrical output signals at its output having varying magnitudes corresponding to the emitted electromagnetic radiation pulses insofar as they are reflected from the circular concentric band in surface 15 to that photodetector. That is, there are pulses in the photodetector output waveform for each electromagnetic radiation pulse reaching that photodetector. These pulses in the output signal of the photodetector are what the signal processing circuitry in system 21 operates on to determine the number of rotations, and the direction thereof, of meter eddy wheel 16. A similar system is shown in U.S. Pat. No. 5,442,281 to M. Frisch and A. Naumaan entitled "Method and Apparatus for Deriving Power Consumption Information from the Angular Motion of a Rotating Disk in a Watt-Hour Meter" which is hereby incorporated by reference herein.

However, this rotation monitoring process is subject to condition changes and disturbances which can affect the accuracy of the result obtained for the number of rotations and the directions thereof. The pulse portions of the photodetector electrical output signal corresponding to the reflected radiation pulses impinging on photodetector 18 are detected as occurring with respect to other portions of the signal through the magnitudes thereof exceeding a threshold value. That threshold value is selected to be between the expected output pulse magnitude corresponding to radiation pulses reflected from the least reflective portion of the eddy wheel concentric band outside low reflectivity mark 17 and the output signal value expected for radiation pulses reflected from the most reflective version of low reflectivity mark 17.

Yet, electronic component parameter variation from batch to batch, the circuit operating conditions such as temperature, mounting alignment between LED's 11 and 12 and photodetector 18, and electronic component aging can lead to considerably different magnitudes in the pulses occurring in the output signal of photodetector 18. Thus, magnitudes in the output signal from photodetector 18 may shift in a direction with the result that the threshold value no longer sufficiently discriminates between output signal magnitudes for radiation pulses reflected from the non-reflective mark and those reflected from the rest of the concentric band.

Further complicating the possibility of shifts in the output signal of photodetector 18 is the occurrence of electrical "noise" which may occur in the output signals of photodetector 18, perhaps primarily due to the varying reflectivity of the concentric band of wheel 16 at locations other than the edges of low reflectivity mark 17, and may also occur in the circuitry of operation and processing system 21. All of such noise can lead to further shifts in the signal with respect to the threshold value, shifts which are to a substantial degree random in nature. In addition, external attempts may be made to tamper with the meter, such as through use of external electromagnetic radiation sources, to cause operating and processing system 21 to provide erroneous results with respect to the amount of electrical power consumed. Thus, there is desired an implementation for operation and processing system 21 which can operate LED's 11 and 12 and photodetector 18 so as to provide proper rotation counting even in the face of such condition change and disturbance possibilities.

SUMMARY OF THE INVENTION

The present invention provides an optical reflectivity sensing system for sensing areas on a rotating surface of differing reflectivities to selected electromagnetic radiation despite other conditions changing in the system such as the magnitudes of that radiation. Such radiation from a source after impinging on these areas may be directed to a radiation detector providing corresponding signals to a threshold detector that provides threshold crossing indications in its output signal corresponding to those radiation detector output signals portions that go beyond the threshold detector threshold value. A rotation sensor also provides a checking indication if a number of complete rotations of the rotating surface has occurred in corresponding checking intervals. A controlled current generator supplies current to the source so as to tend to oppose changes in rates of threshold crossing changes during the checking intervals based on such threshold crossing changes occurring during those checking intervals for which a checking interval indication was provided.

A second source can be provided to emit radiation to impinge on the sensing areas which also may be directed to the radiation detector providing corresponding signals to the threshold detector that provides threshold crossing indications in its output signal corresponding to those radiation detector output signals portions that go beyond the threshold detector threshold value. The current through this second source is provided by the controlled current generator so as to again tend to oppose changes in rates of threshold crossing changes during those checking intervals on a similar basis.

The threshold detector can also be used with a smaller threshold value in the determining of the rotations of the rotating surfaces. A filter attenuating lower frequencies can be used ahead of the threshold detector, especially a correlated double sampled integrator type of filter.

BRIEF DESCRIPTION OF THE DRAWINGS

FIGS. 3A and 3B show timing diagrams for the system of FIG. 2, FIGS. 4A and 4B show alternative electrical circuit schematic diagrams for a portion of the system of FIG. 2.

DETAILED DESCRIPTION OF THE PREFERRED EMBODIMENTS

Figure 1:
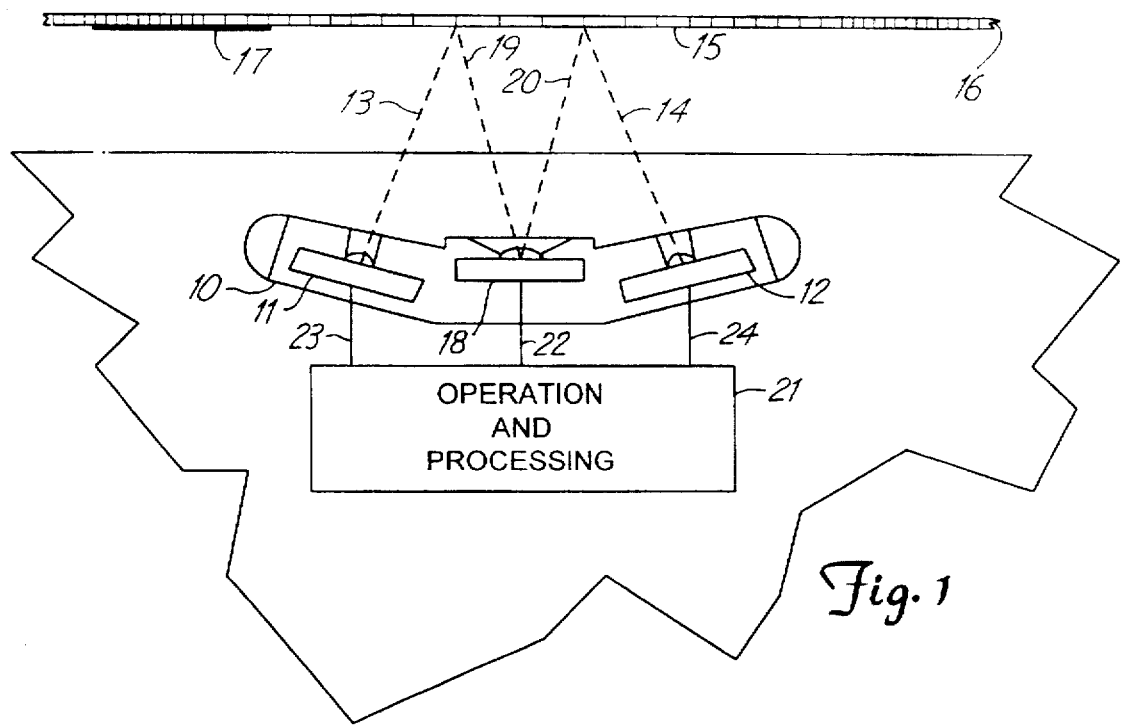
FIG. 1 shows a fragmentary view of a rotating surface sensing structural arrangement and a sensing system block diagram.
Figure 2:
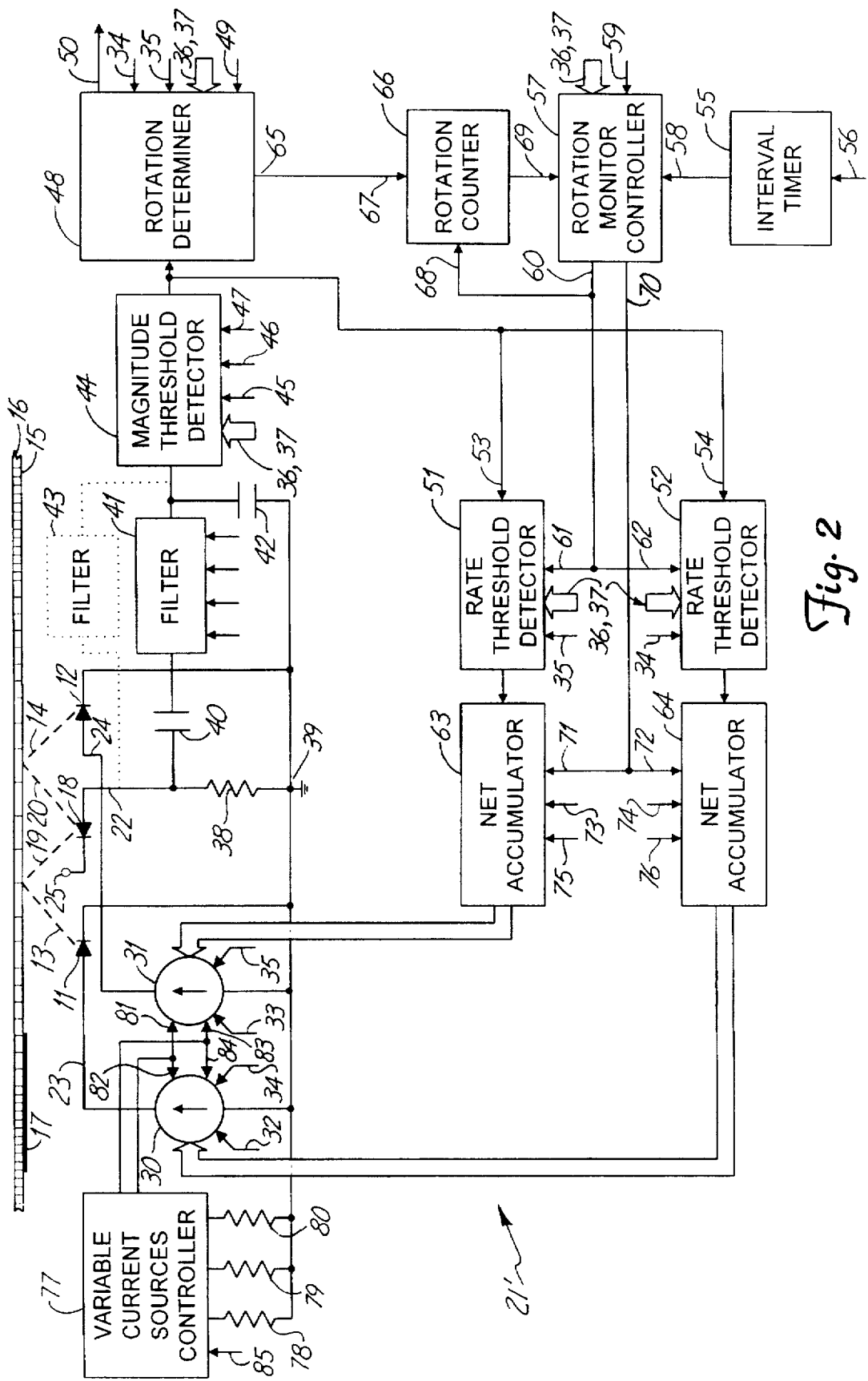
FIG. 2 shows a mixed electrical circuit schematic diagram and block diagram for the system embodying the present invention.

A system portion, 21', of operating and processing system 21 of FIG. 1, adapted to counter the results of changing conditions and disturbances to which system 21 is subject as described above, is shown in the mixed circuit schematic and block diagram of FIG. 2 along with some other portions of the system of FIG. 1. A portion of eddy wheel 16 from FIG. 1 is again shown in FIG. 2 with side 15 thereof facing LED's 11 and 12 and photodetector 18 as in FIG. 1 where photodetector 18 has been shown in the form of a diode though it need not necessarily be one. The cathode of the diode shown for photodetector 18 is shown connected in FIG. 2 to a terminal, 25, suited for connection to a source of regulated positive voltage, typically 5.0 volts. Typically, photodetector 18 is provided as a p-i-n photodiode and operated in the arrangement shown to result in a reverse bias voltage thereacross to provide output photocurrents at its anode proportional to any photon fluxes intercepted thereby.

LED's 11 and 12 are operated by temperature compensated, digitally controlled, pulse operated current sources, 30 and 31, so that the output photon fluxes from each will be linearly related to the magnitudes of the controlling input variable which here is the current supplied therethrough by the corresponding one of these variable current sources to which it is connected. These output photon fluxes from LED's 11 and 12 are what propagate to surface 15 of eddy wheel 16 to either be reflected therefrom to thereby in part reach photodetector 18, or to be substantially absorbed by low reflectivity mark 17. The temperature compensation and the digital controllability features of variable current sources 30 and 31 allow adjusting the magnitudes of the current supplied through LED's 11 and 12, and so adjusting the output photon flux therefrom, to compensate for changing conditions such as changes in the ambient temperature or the aging of the circuit components involved as examples.

The pulsed operation of current sources 30 and 31 results in the system of FIG. 2 obtaining data on the rotation of eddy wheel 16 for relatively short times on a periodic basis, i.e. the system of FIG. 2 operates as a sampled data system. Variable current sources 30 and 31 are alternately activated to generate current pulses repeatedly in time so that photodetector 18 detects a sequence of photon flux pulses after reflection thereof from eddy wheel 16 alternating between those due to current source 30 and LED 11 and current source 31 and LED 12 to result in this sequence being formed of a pair of interleaved subsequences each associated with one of LED's 11 and 12 as a source thereof. The magnitudes of these photon flux pulses will vary considerably depending on whether they are reflected from the shiny part of surface 15 of eddy wheel 16 or from low reflectivity mark 17 covering a part of surface 15. Thus, the information obtained about the rotation of eddy wheel 16 is contained in a corresponding sequence of photocurrent pulses of correspondingly varying magnitudes provided at the anode of the photodiode serving as photodetector 18 with every other such photocurrent pulse being due to LED 11 to form one photocurrent pulse subsequence, and the remainder of those photocurrent pulses in the output photocurrent pulse sequence being due to LED 12 forming another photocurrent pulse subsequence interleaved with the first described photocurrent pulse subsequence.

Figure 3B:
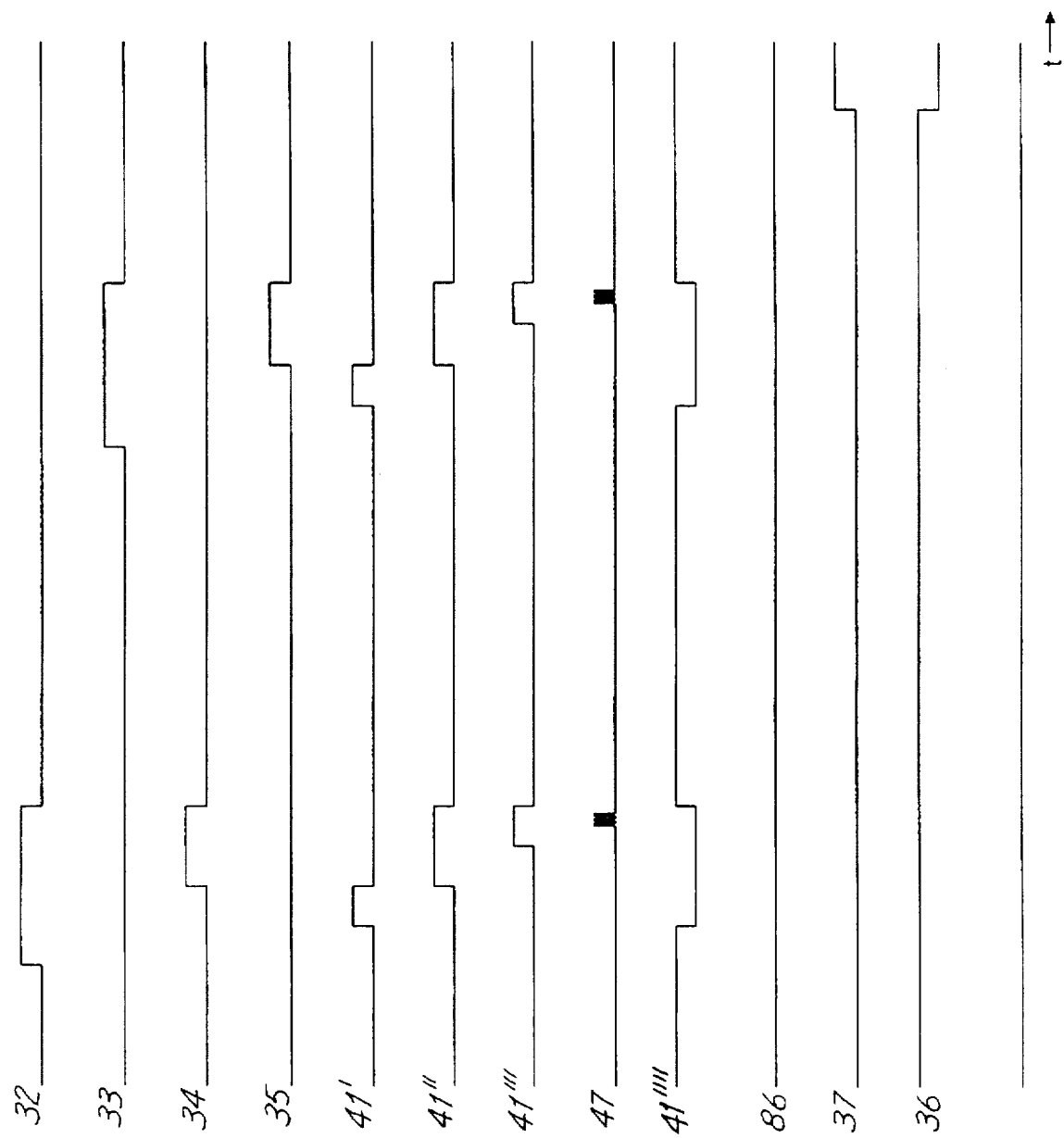

The digital logic circuit based timing signals for directly controlling the pulsed activations in time of variable current sources 30 and 31, and for direct timing control of the actions of some of the other blocks in the diagram of FIG. 2, are generated in a timing control signal generator not shown in FIG. 2 using well known techniques based on well known digital logic circuits and time bases. The inputs of such timing signals to these blocks and to variable current sources 30 and 31 are shown in FIG. 2 as arrows directed into the entity involved. Thus, the timing logic signal for activating variable current source 30 to provide an output initialization current pulse to LED 11 is provided to source 30 at a timing signal input thereof, 32, and the timing logic signal for similarly activating variable current source 31 at alternate times to provide an output initialization current pulse to LED 12 is provided to source 31 at a timing signal input thereof, 33. Similarly, the timing logic signal for activating variable current source 30 to provide an output operating current pulse to LED 11 during the providing of the initialization current thereto is provided to source 30 at another timing signal input thereof, 34, and the timing logic signal for similarly activating variable current source 31 to provide an output operating current pulse to LED 12 during the providing of the initialization current thereto is provided to source 31 at another timing signal input thereof, 35. The associated logic waveforms versus time for the timing logic signals are shown in FIGS. 3A and 3B. The timing logic signal waveforms displayed in FIG. 3A represent timing signal occurrences in the first phases of a four phase timing signal generation sequence forming full cycles of the periodic timing signals, the four different phases therein designated by the various logic states occurring in a pair of phase timing digit logic signals, 36 and 37, for which partial waveforms are also shown in FIGS. 3A and 3B. FIG. 3A shows the timing logic signal waveforms generated for the first phases of the periodic timing signals cycles showing both phase timing digit logic signals 36 and 37 having a low voltage value state, or a binary number system "0" value. At the end of first phases of timing logic signal generation cycles, phase timing digit logic signal 36 changes into a high voltage value state, or a binary number system "1" value shown in the waveforms of FIG. 3A and carrying over into FIG. 3B where the timing logic signal waveforms for the second phases are shown. Phase timing digit logic signal 37 remains at a "0" value in both the first and second phases of timing logic signal generation cycles but changes to a "1" value as shown in the waveforms of FIG. 3B for the timing logic signals in the third phases of timing logic signal generation cycles. The timing logic signal waveforms for the third and fourth phases of timing logic signal generation cycles are used primarily in connection with other portions of system 21 not shown in FIG. 2 and they will therefore not be shown or described here.

Full timing logic signal generation cycles are provided by the timing control signal generator at a rate of 1,024 Hz. As a result, the occurrence of four phases per full cycle means that timing logic signal phases are provided by the timing logic signal generator at a rate of 4,096 Hz. Hence, for first phases of full timing logic signal generation cycles, as shown in the waveforms of FIG. 3A, variable current sources 30 and 31 are activated by signals 32 and 33 to provide output initialization current pulses followed by being activated by signals 34 and 35 to provide output operating current pulses, and so LED photon flux pulses due to these operating current pulses, at a rate of 1,024 Hz. Although the waveforms for signals 32, 33, 34 and 35 appear in the same form in FIG. 3B for second phase activities as they do for FIG. 3A for first phase activities, these are in fact only activated in every eighth one of the second phases of the full timing logic signal generation cycles to extend the service time of LED's 11 and 12 before failure thereof, and so the second phase activities actually occur at a rate of 128 Hz. (In the other two remaining phases not described, current sources 30 and 31 are not activated into conducting current pulses at all.) The initialization current pulses are begun being provided to LED's 11 and 12 by variable current sources 30 and 31 ahead of the operating current pulses to charge parasitic capacitances, especially between the LED's and the photodetector, so that the LED's are charges to near their operating voltages when the operating current pulses are begun to thereby reduce resulting transients to avoid coupling a large transient signal to photodetector 18 that would be transmitted onward leading to possible error.

The photocurrent pulses provided at the anode of the photodiode serving as photodetector 18 in response to intercepted photon flux pulses are provided across a resistor, 38, connected from the anode of that photodiode to a ground reference voltage at a ground reference terminal, 39, this terminal being suited for connection to a ground reference of a voltage source. Resistor 38, of course, in addition to being the output load for photodetector 18, also serves as part of the biasing circuit for the photodiode serving as that photodetector in being connected in series therewith such that the series combination is connected between terminal 25 and ground reference terminal 39. A typical value for resistor 38 is 3.4 kΩ. Such photocurrent pulses thereacross lead to corresponding signals being coupled by a capacitor, 40, into an active filter, 41, formed by a correlated double sampled integrator to be described below. A typical value for capacitor 40 is 0.1 µF. The output signal of filter 41 will be a voltage signal comprising a sequence of voltage pulses corresponding to the sequence of photocurrent pulses provided at the anode of the photodiode serving as photodetector 18 after filtering of the signals these photocurrent pulses provide to capacitor 40.

Resistor 38 and capacitor 40, in addition to their biasing, output and coupling functions, together also provide a passive, single pole high-pass filter having a cutoff frequency chosen to be approximately 450 Hz. This cutoff frequency for this filter has been chosen so that sufficiently slow changes in the ambient optical background sensed by photodetector 18 will be substantially attenuated to thereby prevent them from being significantly included in the signals to be subsequently processed in the remaining portions of the circuitry. That is, magnitude changes of the ambient optical background that occur at change rates that are sufficiently slow, so slow as to have the frequency content of the corresponding change in the optical intensity waveform occur primarily at frequencies below this cutoff frequency, will be severely attenuated in passing through this high-pass filter. Thus, the cutoff frequency should be selected to be sufficiently high to reject signals which may come about from ambient optical background changes due to common forms of optically based tampering efforts directed toward altering the metering results or from other common sources of ambient optical background changes.

On the other hand, because the output of the filter formed by these passive components and filter 41 is supplied to magnitude threshold detectors connected to the output of filter 41, as will be described below, the upper limit for this chosen cutoff frequency must be sufficiently low to allow the photocurrent pulses from the photodiode serving as photodetector 18 to substantially maintain their magnitudes through the filter. This cutoff frequency of this passive component filter must not be set to so high that these pulses are so attenuated that the filter output pulse response, which should allow sufficient pulse magnitudes to exceed the magnitude detectors thresholds, does not do so. This limit is determined by the durations chosen for the current pulses provided by variable current sources 30 and 31, and so the durations of the photocurrent pulses provided at the anode of the photodiode serving as photodetector 18, and by what is an acceptable amount of fall-off in the corresponding filter output response with respect to the detector thresholds. In addition, the high-pass filter provided by resistor 38 and capacitor 40 lowers the dynamic range of the signals provided to active filter 41 thereby easing the design constraints on the electronic circuits therein.

Filter 41 operates by first sampling the then current ambient optical background signal represented in the output signal of photodetector 18 which is coupled to the input of filter 41 by capacitor 40, as directed by a timing logic signal, 41', shown in FIGS. 3A and 3B switching appropriate switches therein during the first and second phases. Such preparatory signal samples of the ambient optical background are each subtracted from the corresponding immediately following signal sample taken during the immediately following corresponding one of the emissions by LED's 11 and 12 as directed by a timing logic signal, 41", shown in FIGS. 3A and 3B again switching appropriate switches in filter 41 during the first and second phases. The portions of the signal unchanged over the short duration between the taking of these successive samples, due primarily to the optical ambient background, are effectively canceled. The resulting differences that do occur between these samples represent primarily the effects of the emitted electromagnetic radiation pulses after being time integrated.

The value of each of the time integrated differences resulting is maintained for a short time toward the end of the corresponding radiation pulse emission occurrence in an output hold circuit partially contained in filter 41 as directed by a timing logic signal, 41''', shown in FIGS. 3A and 3B once more switching appropriate switches in filter 41 during the first and second phases. The resulting voltage pulses form a corresponding sequence thereof through successive cycles for each of the first two phases to thereby provide the filter output signals. The integrator is cleared of charge during times the input signals are not being sampled and held, again as directed by a timing logic signal, 41'''', shown in FIGS. 3A and 3B that is switching appropriate switches in filter 41 during the first and second phases. The storage for this output hold circuit is provided by a capacitor, 42, typically of value 47 pF, connected between the output of filter 41 and ground reference 39.

Except for LED's 11 and 12, photodetector 18, and the resistors and the capacitors specifically shown in FIG. 2, system portion 21' of FIG. 2 can be entirely fabricated within a monolithic integrated circuit including active filter 41. An alternative external high pass active filter, 43, is shown in FIG. 2 in dashed lines having its input directly connected to the anode of the photodiode serving as photodetector 18, and its output directly connected to the same point at which the output of filter 41 is connected. Such an external filter allows a user more convenient adjustability in selecting the filtering characteristic if such a capability is desired but, without being integrated, the ambient optical background cancellation cannot be provided as cheaply to result in as much attenuation of that background. This filter is typically a conventional two pole, or second order, high-pass filter having a transimpedance gain of 650 k$\Omega$ and a cutoff frequency again of 450 Hz. Both of these filters will be more fully described below insofar as the characteristics thereof in connection with the corresponding circuit schematic diagrams.

The part of system portion 21' described above can be represented at the output of either of filters 41 or 43 for a voltage pulse in the sequence thereof forming the voltage output signal pulse, $V_{out-41}$, provided there by the equation $$V_{out-41} = I_{vcs-30,31} \, E_{3-11,12} R_{w-16}(\theta) R_{d-18} \, H_{f-38,40,41;43}$$

which voltage pulse occurs during the provision of a corresponding operating current pulse by one of variable current sources 30 or 31 in the sequence of current pulses they provide to thereby cause a corresponding sequence of such voltage pulses in forming the output signal of either of those amplifiers. In this equation, $I_{vcs-30,31}$ represents the magnitude of the corresponding current pulse provided by either one of variable current sources 30 or 31, $E_{e-11,12}$ represents the irradiance or the photon flux density provided by the corresponding one of LED's 11 or 12, $R_{d-18}$ represents the responsivity of photodetector 18, and $H_{f-38,40,41;43}$ represents the transfer function of the filtering provided by the passive filter formed from resistor 38 and capacitor 40 along with filter 41, or alternatively, with filter 43.

In addition, $R_{w-16}(\theta)$ represents the reflectivity of eddy wheel 16 at the location at which it intercepts the photon flux, or electromagnetic radiation, pulse arising from the current pulse which depends on its angle of rotation $\theta$ both at the exposed portion of surface 15 and at the portion thereof covered by low reflectivity mark 17. In the angular range of the band intercepting the photon fluxes form LED's 11 and 12, this reflectivity is $$R_{w-16}(\theta) = A_r + n_r$$

on the exposed portion of surface 15. Here, $A_r$ represents the average reflectance of that surface portion and $n_r$ is a zero mean random variable representing the random variability in the surface reflectance due to surface imperfections, etc.

The reflectivity at low reflectivity mark 17, typically "painted" onto a portion of surface 15 to cover a small angular range of the band intercepting the photon fluxes form LED's 11 and 12, is $$R_{w-16}(\theta) = \frac{A_r}{r_1} + \frac{n_r}{r_2}$$

where $r_1$ represents the optical contrast ratio in the average reflectance of the exposed portion of surface 15 versus the average reflectance of low reflectivity mark 17 which is much lower due to the radiation absorbent nature of the material used to form mark 17. The other denominator $r_2$ is the ratio between the zero mean random variable representing the random variability in the surface reflectance of the exposed portion of surface 15 versus the zero mean random variable representing the random variability in the surface reflectance of low reflectivity mark 17 which is also significantly smaller due to the smoother surface resulting from applying that mark to surface 15. This last expression assumes this filling of surface irregularities by the material used in forming mark 17 beyond being radiation absorbent and reducing the magnitude of the surface irregularities so that the resulting zero mean random variable $n_r/r_2$ representing the surface reflectance at that mark is a linear function of the zero mean random variable $n_r$ representing the surface reflectance of the rest of surface 15. Otherwise, another random variable can be used for this representation.

The output voltage signal from either of the filters 41 or 43 containing the sequence of voltage pulses described above is provided to a magnitude threshold detector, 44, in system portion 21' of FIG. 2. Detector 44 performs different functions in different phases of the timing signals full cycles, and its activities in the first phases of those cycles are directed to occur by phase timing digit logic signals 36 and 37 indicated to be supplied thereto by a block arrow directed toward it with these signal designations. In the first phases, magnitude threshold detector 44 is used in connection with the determination of rotations of eddy wheel 16. Detector 44 has a pair of threshold values of different values selectively set by an external threshold value source not shown. These threshold values are provided to detector 44 at a pair of threshold value inputs which, similar to the timing logic signal inputs, are also represented by arrows, 45 and 46, shown in FIG. 2 directed into that detector. Detector 44 also receives a further timing logic signal, 47, from the timing control signal generator which serves to control sampling used in detector 44 to improve reliability. The waveform for this signal is shown in both FIGS. 3A and 3B, and can be seen to occur during the last half of the time duration in which the hold circuit in filter 41 is operated to store the most recent voltage pulse value in the sequence of voltage pulses provided at the output of that amplifier in forming the output signal therefrom.

Detector 44 can be implemented using a comparator having a reference input which is switched to be connected to threshold value input 45 in first phases of the timing signals full cycles, and to threshold value input 46 in second phases by phase timing digit logic signals 36 and 37. This comparator also has a signal input which is switched to receive the output signal from filter 41 (or alternatively from the output of filter 43 if used instead) in first phases and in second phases of the timing signals full cycles by phase timing digit logic signals 36 and 37. The output of this comparator is connected to the input of a flip-flop which is enabled three successive times during the time interval that a voltage pulse is held at the output of filter 41 to change its stored state by the three pulses in timing logic signal 47, and the resulting output logic state values of the flip-flop are stored. The flip-flop will store one logic state value for the output signal pulse of filter 41 exceeding the threshold value of the comparator, and store the opposite logic state value for the output signal pulse of filter 41 being less than the threshold value. This activity, in effect, takes and stores three successive samples of the logic state value result of comparing the magnitude of a pulse in the output signal from filter 41 to the threshold value being used by the comparator. A conventional logic circuit determines which of the three logic state values stored is in the majority, and then provides at the output of detector 44 that logic state value found to be in the majority. Such a procedure reduces the possibility that any variation occurring in the magnitude of the filter 41 output signal voltage pulse could lead to an erroneous value for the logic state value provided at the output of determination detector 44.

The output of magnitude threshold detector 44 is supplied to a rotation determiner, 48, where the logic state values represented in the output signal of determination detector 44 during first phases of timing signals full cycles are used as a basis for determining the occurrences of rotations, both clockwise and counterclockwise, of eddy wheel 16 during such first phases. Such occurrences can be determined by rotation determiner 48 based on the logic state values occurring in output voltage signal of detector 44 using logic circuits contained in rotation determiner 48 to perform the logical functions thereon disclosed in U.S. Pat. No. 5,442,281 incorporated herein above. Rotation determiner 48 accomplishes these determinations by essentially considering successive pairs of logic state output values in the output signal of detector 44 in first phases of timing signals full cycles (one logic state value in each such pair being due to variable current 30 and LED 11 and the other due to variable current source 31 and LED 12). Rotation determiner 48 determines from these pairs whether each pair of logic state values therein came about from the electromagnetic radiation pulses of LED's 11 and 12 both being reflected from shiny surfaces portions in the exposed part of surface 15, both reflected from low reflectivity mark 17 on surface 15, or one reflected from mark 17 and the other from a shiny surface portion. The logic circuits in determiner 48, by determining this information, can then determine both the occurrences of rotations of eddy wheel 16 and the direction of such rotations. These determinations by rotation determiner 48 are supplied in digital form therefrom to a system microprocessor, not shown, through use of a microprocessor interrupt routine to be accumulated by the microprocessor and associated digital memory as a count of these rotations of eddy wheel 16 to indicate net power consumption in the system being metered.

To accomplish these determinations, the logic circuits in rotation determiner 48 must be supplied with phase timing digit logic signals 36 and 37 to enable determiner 48 to perform its operations during the first phases of timing signals full cycles, these signals being indicated to be supplied to determiner 48 by a block arrow in FIG. 2 directed therein and labeled with these signal designations. In addition, these logic circuits must be supplied with timing logic signals 34 and 35 indicating when operating current pulses are provided by variable current sources 30 and 31 to properly associate them with the logic state values in the output of detector 44, and these signals are shown supplied to determiner 48 by arrows directed toward it carrying these designations. Further, a timing logic signal having a period equal to the full cycle of the timing signals is supplied on a further timing signal input, 49, to determiner 48 for synchronizing these operations and the determination data provided at the output of determiner 48. The output of rotation determiner 48 is provided at the output thereof indicated by an arrow, 50, directed therefrom to the right in FIG. 2.

In every eighth second phase following first phases in timing signals full cycles, detector 44 is directed to undertake second phase activities by phase timing digit logic signals 36 and 37, including having the reference input of the comparator therein switched to be connected to threshold value input 46 as indicated above. Detector 44 again operates in approximately the same manner in this second phase role as it did in the first phases of the timing signals full cycles in connection the determination of rotations of eddy wheel 16, including using timing logic signal 47 to direct the effective sampling of the output signal supplied at the output of filter 41 during each hold period. Thus, the output signal from detector 44 in second phases is again a voltage signal having one of two logic state values depending on whether the output voltage pulses in the output signal of filter 41 have magnitudes which exceed or do not exceed the threshold value now used in detector 44.

That is, the voltage signal at the output of detector 44 in second phases provides information as to whether the electromagnetic radiation pulses detected by photodetector 18, as a result of operating current pulses being supplied by variable current sources 30 and 31 to LED's 11 and 12 were of a sufficient magnitude to provide voltage pulses at the output of filter 41 that exceed the threshold value set in detector 44, a test which should be indicative of whether the corresponding electromagnetic radiation pulses from LED's 11 and 12 were reflected from exposed portions of surface 15 or from low reflectivity mark 17. This is essentially the same information which is provided in the output signal of detector 44 in first phases, although with respect to the threshold value chosen there which need not be the same as that chosen here. The validity of this information obtained in the first phases, however, assumes that the magnitudes of the electromagnetic radiation pulses were of intensity values a) sufficient to cross the threshold values of magnitude threshold detector 44 in first phases of the timing signals full cycles when reflected from the exposed or shiny portions of surface 15, and were b) insufficient to exceed the threshold values in these phases when reflected from low reflectivity mark 17.

Unfortunately, optoelectronic components such as LED'S 11 and 12 and the photodiode serving as photodetector 18 tend to have wide tolerances so that selecting them at random to incorporate in manufactured metering systems can result in wide variations in the magnitudes of the responsive photocurrents in the output signal of photodetector 18 for any particular magnitudes chosen for the operating current pulses provided at the outputs of variable current sources 30 and 31. Furthermore, the accuracy of the alignment along the desired optical paths of these components during manufacturing is quite demanding if similar results are desired insofar as the magnitudes of the photocurrents obtained from photodetector 18 in response to the magnitudes of the operating current pulses supplied by both variable current sources 30 and 31, or these source pulse magnitudes must be separately adjusted. Even if the metering module could be manufactured conveniently to provide repeatable results in terms of the photocurrents obtained from photodetector 18 for the operating current pulses supplied by variable current sources 30 and 31, electronic components are known to change their characteristics with changes in their environments, such as temperature, and to change their characteristics as a result of aging. In addition, dust and other kinds of items can have the effect of changing the nature of the optical paths between LED's 11 and 12 and photodetector 18.

As a result of all of these potential problems, a practical optical based data acquisition subsystem for a metering system requires adjustment of either the operating current pulse magnitudes supplied from variable current sources 30 and 31 to maintain desired magnitudes of the responsive photocurrents provided by photodetector 18, or adjustment of the magnitudes of responsive photocurrents themselves provided by photodetector 18, if the magnitudes of these photocurrents are to remain compatible with the subsequent signal processing circuitry. This can be accomplished using a feedback loop to regularly adjust the magnitudes of the operating current pulses supplied by variable current sources 30 and 31 under appropriate conditions to thereby provide suitable magnitudes for these operating current pulses, and so for photon flux pulses, or electromagnetic radiation pulse intensities, from LED's 11 and 12, so as to have the responsive photocurrents provided by photodetector 18 be of magnitudes that result in properly sized voltage pulses in the output signal of filter 41 for the threshold values chosen for magnitude threshold detector 44.

The values to be used for the magnitudes of the operating current pulses supplied by variable current sources 30 and 31 are not easily determined in the meter operating environment because eddy wheel 16, from which the photon flux, or electromagnetic radiation, pulses from LED's 11 and 12 are to be reflected, can be in any position at any of the times during which such metering is occurring. Thus, an attempt to calibrate the system by adjusting the magnitudes of the operating current pulses of these current sources at any particular time can lead to improper results since the reflectivity of the portion of surface 15 used for reflection at the time of such a calibration is essentially unpredictable. The magnitudes of the operating current pulses could be determined too low if a very bright portion of surface 15 intercepted the electromagnetic radiation pulses emitted by LED's 11 and 12 at the time of such a calibration or, alternatively, the magnitudes of the operating current pulses could be determined too high if the electromagnetic radiation pulses were emitted by LED's 11 and 12 at the time of such a calibration impinged instead on low reflectivity mark 17. Similarly, improper calibrations could occur if the electromagnetic radiation pulses emitted from one of LED's 11 and 12 impinged on low reflectivity mark 17 while those from the other impinged on exposed portions of surface 15. Thus, a standard against which a calibration can proceed during metering operations is difficult to set.

System portion 21' shown in FIG. 2 is based on regularly obtaining data in a regularly occurring variable current source operating current updating process, but only such data as is obtained from exposed portions of surface 15 and then only if eddy wheel 16 is known to be moving so that a number of different regions of exposed surface 15 are thereby known to be contributing to the data being relied upon for such updating. This updating is accomplished through using only those voltage pulses in the output voltage signal of filter 41 which exceed the threshold value of detector 44 during first phases of timing signals full cycles, and then only using those pulses when a sufficient rotation rate of eddy wheel 16 has been determined to have existed during the occurrences of those pulses.

Magnitude threshold detector 44, during second phases of the timing signals full cycles, is the first element in a pair of feedback loops for controlling the magnitudes of the operating current pulses supplied by variable current sources 30 and 31. The common part of the feedback circuits in these loops ends with detector 44 as the output thereof is connected to a pair of rate threshold detectors, 51 and 52, at corresponding inputs, 53 and 54. Rate threshold detectors 51 and 52 are supplied with phase timing digit logic signals 36 and 37 to enable them to perform their operations during the second phases of timing signals full cycles when data is acquired for the updating process, these signals being indicated to be supplied to detectors 51 and 52 by a block arrow in FIG. 2 directed therein and labeled with these signal designations. Each of rate threshold detectors 51 and 52 can be implemented using an "up" digital counter which can count up to its maximum count value capability if not reset during such counting, and then holds that maximum count value until subsequently reset, sometimes termed a "saturating" counter. The outputs of such counters implementing each of rate threshold detectors 51 and 52 provide a high logic state value thereat should the up counters in these detectors reach their maximum count value, but otherwise provide a low logic state value until such an event occurs.

Such an up counter in each of the rate threshold detectors has its possible count increments permitted at times set by, or is "clocked" by, the same timing logic signal used to initiate an operating current pulse from the corresponding one of variable current sources 30 and 31 that results in a logic state value being provided thereto in the output signal of detector 44. That is, the up counter in rate threshold detector 51 has timing logic signal 35 applied to its clock input to enable it to count an input high logic state voltage value applied to the input thereof by detector 44 which is the same timing logic signal used to activate variable current source 31 to provide an operating current pulse to LED 12. Similarly, the up counter in rate threshold detector 52 is clocked by timing logic signal 34 to enable it to count an input high logic state voltage value applied to the input thereof by detector 44 which is the timing logic signal used to activate variable current source 30 into providing an operating current pulse to LED 11. Both counters in these detectors are clocked by the corresponding falling edges of signals 34 and 35 to permit the sampling directed by signal 47 to be completed first. Thus, rate threshold detectors 51 and 52 count only high logic state values in the output signal of detector 44 which are logic state values resulting from only those electromagnetic radiation pulses initiated by the corresponding variable current source which are of sufficient intensity to result in a voltage pulse at the output of the filter 41 having the magnitude exceeding the threshold value of detector 44. As a result, only those electromagnetic radiation pulses reflected from the exposed portions of surface 15 are included in the count values stored in rate threshold detectors 51 and 52.

However, rate threshold detectors 51 and 52 have only a certain amount of time in which to have the count held therein reach its maximum possible value. This is because the up counters therein are resettable to a zero value, and such resettings of rate threshold detectors 51 and 52 are provided for in system portion 21' of FIG. 2 once every minute. This is accomplished by having a periodic timing signal, or clocking signal, provided to an interval timer, 55, at a clocking input thereof, 56. That clocking signal has the frequency thereof divided sufficiently by counters to change the output signal of interval timer 55 from a low logic state value to a high logic state value at the end of each minute, and then interval timer 55 resets itself to begin again the timing of another minute. The output of interval timer 55 is supplied to a rotation monitor controller, 57, at an input thereof, 58.

Rotation monitor controller 57 also receives a clocking signal at a clocking input thereof, 59, having a frequency set by a period equal to the timing signals full cycle time duration, this clocking signal being used to synchronize with the timing logic signals the high logic state value provided in the output signal of interval timer 55 each minute to form a high logic state value in the output signal of rotation monitor controller 57 supplied from an output thereof, 60, to both of the reset inputs of the up counters in rate threshold detectors 51 and 52 to reset them. The counter reset input in rate threshold detector 51 serving as an input, 61, thereof, and the counter reset input in rate threshold detector 52 serving as an input, 62, thereof. Since the resetting of rate threshold detectors 51 and 52 could disturb system activities occurring in phases one and two of the timing signals full cycles, they are reset in either third or fourth phases instead through being enabled to do so by phase timing digit logic signals 36 and 37 as indicated to be supplied to rotation monitor controller 57 by a block arrow in FIG. 2 directed therein and labeled with these signal designations.

Hence, as stated, rate threshold detectors 51 and 52 in system portion 21' have only a certain amount of time in which to have the count held therein reach its maximum possible value (typically a four bit binary counter giving a maximum possible count value of 16). Thus, rate threshold detectors 51 and 52 will provide in the output signals therefrom a high logic state voltage value only when the number of corresponding high logic state voltage values in the output signal of detector 44 corresponding thereto equal or exceed the maximum count value of the up counters used therein within one minute, in effect, requiring the number of corresponding voltage pulses in the output signal of filter 41 exceeding the threshold value of detector 44 in second phases of the timing signals full cycles per unit time to exceed a selected rate to result in a high logic state value in the output signals of rate threshold detectors 51 and 52. Since only the number of voltage pulses in the output signal of filter 41 exceeding the threshold value of detector 44 are given effect in this counting, only the photon flux, or electromagnetic radiation, pulses reflected from the exposed portion of surface 15 of eddy wheel 16 are effective to increment the stored counts in rate threshold detectors 51 and 52 with those pulses reflected from low reflectivity mark 17 being ignored in this counting.

These output signals from rate threshold detectors 51 and 52 are each provided to a corresponding one of a pair of rate crossing net accumulators, 63 and 64. Each of net accumulators 63 and 64 can be implemented using an "up-down" digital counter which can count across its counting range in either the increasing count direction or the decreasing count direction, but the count is held at either of the counting range endpoints if reached. Typically, the endpoints of such counters used in net accumulators 63 and 64 are 0 and 63 since a six bit binary counter is typically used.

The output signals of rate threshold detectors 51 and 52 are each provided to the counting direction control input of the up-down counter serving in the corresponding one of net accumulators 63 and 64 with a high logic state value in these output signals directing the corresponding counter to decrement its stored count value and a low logic state value directing it to increment its stored count value to result in these feedback circuits providing negative feedback. As a result, each of net accumulators 63 and 64 has a stored count value representing the net of the count of low logic state values provided thereto by its corresponding one of rate threshold detectors 51 and 52 over the count of high logic state values provided thereto by that same detector. That is, net accumulators 63 and 64 store the net of the number of one minute periods in which the rate threshold, established by the corresponding one of rate threshold detectors 51 and 52 along with interval timer 55, for electromagnetic radiation pulses reflected from the exposed portion of surface 15 of eddy wheel 16 has not been exceeded over the number of one minute periods in which that rate threshold has been exceeded.

These net numbers are then used to set the values for the magnitudes of the operating current pulses for the corresponding one of variable current sources 30 and 31 to thereby complete the feedback circuits. The adjusting of these net numbers by a decrement if the corresponding rate threshold is exceeded, and by an increment if the corresponding rate threshold is not exceeded, keeps these operating current pulse magnitudes sufficient to have the voltage pulses in the output signal of filter 41 reflected from exposed surface 15 oscillating closely about the second phase threshold value of detector 44. As a result, those filter 41 output signal voltage pulses will always exceed the first phase threshold value of detector 44 which is chosen to have a somewhat smaller than the second phase threshold value of detector 44.

However, not every one minute period in which results are obtained in the rate threshold detectors, as to whether the rate threshold thereof has been exceeded or not by the rate of corresponding electromagnetic radiation pulses being reflected from the exposed portion of surface 15, subsequently has those results included in the forming of the net number stored in the corresponding net accumulator. Those results are not wanted to influence the value of the stored number in the corresponding net accumulator if they are not based electromagnetic radiation pulses being reflected from a sufficient number of different locations in the exposed portion of surface 15, i.e. if eddy wheel 16 has not been rotating sufficiently during the obtaining of these results. Sufficient rotation is assured by having a high logic state value supplied by rotation determiner 48 from another output thereof, 65, to a rotation counter, 66, at an input, 67, thereof for each rotation of eddy wheel 16 determined thereby to have occurred. Rotation counter 66 can be implemented by using a saturating up counter that can be reset and has a selected maximum count value, typically chosen to be two, and provides and maintains a high logic state value at its output upon reaching this maximum count value until reset. Such resetting is accomplished using the same signal from output 60 of rotation monitor controller 57 used to reset rate threshold detectors 51 and 52, and this signal is provided to a reset input thereof, 68. The output signal from rotation counter 66 is provided to rotation monitor controller 57 at a further input thereof, 69.

Rotation monitor controller 57 at the end of each one minute period determined by interval timer 55 determines whether a high logic state value is present in the output signal of rotation counter 66 and, if so, provides a high logic state value at a further output thereof, 70, to counting enabling inputs, 71 and 72, provided in the up-down counters used in net accumulators 63 and 64 to enable them to have the count value stored therein be incremented or decremented by the output signals of rate threshold detectors 51 and 52. Phase timing digit logic signals 36 and 37 will permit any such incrementing or decrementing of the count values stored in net accumulators 63 and 64 to occur in only third or fourth phases of the timing signals full cycles to avoid disrupting the system activities occurring during first and second phases. A low logic state value in the output signal of rotation counter 66 at the end of such one minute periods will prevent the results of the rate threshold determinations made by rate threshold detectors 51 and 52 from affecting the count values in the corresponding one of net accumulators 63 and 64.

Thus, the net count values stored in net accumulators 63 and 64 are repeatedly subject to adjustment by the results obtained from the reflections of electromagnetic radiation pulses from many locations in just the exposed portion of surface 15 of a sufficiently rotating eddy wheel 16 measured against the second phase threshold value of magnitude detector 44. The threshold value of detector 44 in the first phases is set to a value below the value of the threshold value of detector 44 in the second phases by a value greater than the maximum magnitudes of fluctuations in the voltage pulses in the output signal of filter 41 due to electromagnetic radiation pulses reflected from the exposed portion of surface 15. As a result, the threshold value of detector 44 in the first phases will always be of a value to give the greatest noise margins between that threshold value and the magnitudes of the voltage pulses in the output signal of filter 41 due to pulses reflected from these exposed portions of surface 15 and from low reflectivity mark 17. This arrangement avoids the risk of calibrating the system against an unpredictable surface location at the time of calibration.

Net accumulators 63 and 64 each have a further input, 73 and 74, respectively, providing a serial data connection to the system microprocessor to allow providing for count values to be selected for those accumulators by that microprocessor, and then transmitting those values serially to storage in a shift register in the corresponding accumulator. Finally, the values are stored in the up-down counter therein as initial count values upon the system microprocessor providing a load enabling signal to the corresponding one of two other inputs, 75 and 76, one of which is in each of these accumulators. Such provision of initial count values to net accumulators 63 and 64 occurs after an electrical power failure where the count values current in these accumulators at the time of the failure are obtained and stored by the system microprocessor in a nonvolatile memory, and then inserted into the accumulators upon the resumption of a supply of electrical power.

Another situation in which initial count values are inserted in net accumulators 63 and 64 by the system microprocessor is an initial calibration thereof as a starting point for subsequent regular operation of system portion 21'. In such a circumstance, the system microprocessor loads the up-down counters in net accumulators 63 and 64 with a binary count value that equals 32, i.e. the midrange point of the current pulse magnitude settings of variable current sources 30 and 31, with the exposed portion of surface 15 of eddy wheel 16 fixedly positioned to reflect the electromagnetic radiation pulses of LED's 11 and 12 therefrom. The second phase activities are repeated at a 1,024 Hz rate rather than a 128 Hz rate, and logic circuit arrangements in rotation monitor controller 57 (not shown) terminates the operation of that controller as described above to instead cause it to provide a high logic state value on output 61 thereof for every set of 32 full cycles of the timing signals before each of which sets the up counters in rate threshold detectors 51 and 52 are reset. At the end of every such set the up-down counters in net accumulators 63 and 64 are decremented if the up counters in rate threshold detectors 50 and 51 are saturated, and incremented if not. Following this procedure for 32 sets allows the count values initially stored in the accumulators up-down counters at the midrange point to be driven to either extreme if appropriate with a calibration time of just one second.

Thus, the availability of the timing signals clock signal of 1,024 Hz, and the current magnitude resolution need found in practice necessitating 64 different values of current pulse magnitudes to give a midrange value of 32 leading to needing 32 up-down counter count value change opportunities to reach the count value extremes, leads to having 32

17 clock signal periods for each set (1024/32). This value (requiring 5 binary bits to be represented in the binary number system) must be exceeded by the maximum count value of the up counters in rate threshold detectors 51 and 52 if those counters are to be able to saturate during a set. Thus, the use of four bit up counters in rate threshold detectors 51 and 52 as indicated above is convenient for this calibration arrangement resulting in maximum count values of 16 to reach saturation. This maximum count capability for these counters is also satisfactory for the normal second phase activities, previously described, in which variable current sources 30 and 31 provide operating current pulses at a 128 Hz rate to LED's 11 and 12 as these counters will get in each one minute period set by interval timer 55 a total of 7,680 opportunities (60*128) to count enough high state logic values in the output signal of magnitude threshold detector 44 to saturate if the LED emissions are being reflected by the exposed portion of surface 15 of eddy wheel 16.

The logic states provided at the six parallel outputs provided in the up-down counters in net accumulators 63 and 64, serving as the outputs of those accumulators, are the binary bits representing the stored count values therein, and these outputs are connected to corresponding parallel magnitude control inputs of the corresponding one of variable current sources 30 and 31 to set the magnitudes of the operating current pulses provided thereby to the corresponding one of LED's 11 and 12. In view of the six bits available in the binary numbers supplied from the parallel outputs of net accumulators 63 and 64 to the parallel magnitude control inputs of the corresponding one of variable current sources 30 and 31, sixty-four different current magnitudes can be specified by such numbers. Each of these current selection alternatives is formed of two current components, a fixed pedestal current selected as the minimum current value ever needed to operate any LED chosen to serve as one of LED's 11 or 12 and a selected current component added thereto. The selected current component has a value set by the binary number provided to the parallel magnitude control inputs, and by the current value differential chosen to be represented by a change in value of the least significant bit on those inputs.

The pedestal current value, the current value differential chosen to be represented by a change in value of the least significant bit, and the temperature coefficient for the currents supplied by variable current sources 30 and 31 are set by a variable current sources controller, 77, and three resistors, 78, 79 and 80, connected therefrom to ground reference 39. One of these resistors selects the pedestal current, and a pedestal selection signal is directed to a corresponding pair of inputs, 81 and 82, of variable current sources 30 and 31 respectively, from controller 77. The other two of these resistors select the temperature coefficient of magnitudes of the operating current pulses, as needed to compensate for the temperature coefficients of photodetector 18, and of Led's 11 and 12, and select the current value differential. The current value differential selection signal is directed to another corresponding pair of inputs, 83 and 84, of variable current sources 30 and 31, again respectively.

The variable current sources 30 and 31 along with controller 77 are based on current mirror circuits operated by a reference current. The binary number digit signals from net accumulators 63 and 64 on parallel magnitude control inputs of the corresponding one of variable current sources 30 and 31 switch on and off weighted current mirror switches to provide the varying current values in addition to the pedestal current based on the current differential value chosen for the least significant bit and on the temperature coefficient value chosen.

18

Since the threshold value of detector 44 in phase one activities needs to distinguish between voltage pulses in the voltage output signal of filter 41 due to reflections from the exposed portion of surface 15 and those from low reflectivity mark 17, there is an advantage in having the magnitude differences between voltage pulses due to these different reflective surfaces be as large as possible to thereby provide the largest noise margins possible between those voltage magnitude values and that threshold value. The actual magnitudes of these two kinds of voltage pulses are never measured, rather, just more or less the midpoint between them is detected being crossed. Therefore, if the signal gain were increased to the point that the larger magnitude voltage pulses forced the output voltage in filter 41 past the operating range limit therefor, there would not be any detrimental consequence (assuming a sufficiently fast recovery by the filter into its operating range), and there would be a noise margin benefit if the smaller magnitude voltage pulses changed to a smaller degree for the same increased signal gain. This is to be expected since the material chosen for low reflectivity mark 17 is intended to reduce the reflection to zero although this result is only approximated.

Because of this opportunity, variable current sources controller 77 has a further gain control input, 85, at which a timing logic signal, 86, is provided to increase the operating current pulse magnitudes from variable current sources 30 and 31 during first phases of the timing signals full cycles a selected multiple of the operating current pulse magnitudes established during second phases. This is accomplished by using this signal to increase the reference current indicated above for the current mirror circuits. Timing logic signal 86 is shown in FIGS. 3A and 3B to be at a high logic state value during first phases in FIG. 3A and at a low logic state value during second phases in FIG. 3B. The noise margin at the input of magnitude threshold detector 44 can be determined from the output signal of filter 41 (or filter 43) $v_{out-41}$ which was given by the equation above as $$V_{out-41}=I_{vcs-30,31}E_{e-11,12}R_{w-16}(\theta)R_{d-18}H_{f-38,40,41;43}$$

but which, in view of the increased current gain G, now becomes $$V_{out-41}=GI_{vcs-30,31}E_{e-11,12}R_{w-16}(\theta)R_{d-18}H_{f-38,40,41;43}$$

or $$V_{out-41}=GK\,R_{w-16}(\theta),$$

where $$K=I_{vcs-30,31}E_{e-11,12}R_{d-18}H_{f-38,40,41;43}.$$

The upper noise margin at the input of detector 44 can be defined as the difference between the expected value of a) the output signal of filter 41 when the electromagnetic radiation pulses from LED's 11 and 12 are reflected from the exposed portion of surface 15 of eddy wheel 16, and b) the threshold value T of detector 44. Thus, the noise margin is $NM_{up-g}=V_{out-41-15\ exp-g}-T$ with the use of increased current gain. Using the last equation above for $v_{out-41}$ along with the equation above for $R_{w-16}(\theta)$ when electromagnetic radiation pulses are reflected from surface 15 to obtain $E[v_{out-41}]=E[GKR_{w-16}(\theta)]=GKE[R_{w-16}(\theta)]=A_r$, the resulting noise margin is $$NM_{up-g}=GKA_r-T.$$

Without increased gain or G=1, the noise margin is $NM_{up-ng}=V_{out-41-15exp-ng}T$ giving $$NM_{up-ng}=KA_rT.$$

The difference between these two noise margins gives the change in the upper noise margin due to the use of added current gain, or $$NM_{up-g}-NM_{up-ng}=GKA_rT-(KA_rT)$$

to yield $$NM_{up-g}-NM_{up-ng}=(G-1)KA_rT.$$

Clearly, the upper noise margin increases if the current gain multiple exceeds one, and thus that gain can be increased to the extent that the voltage pulse magnitudes resulting at the output of filter 41 from the operating current pulses exceed its operating range.

The lower noise margin at the input of detector 44 can be defined as the difference between a) the threshold value T of detector 44, and b) the expected value of the output signal of filter 41 when the electromagnetic radiation pulses from LED's 11 and 12 are reflected from low reflectivity mark 17 on the surface 15 of eddy wheel 16. The noise margin is $NM_{low-g}=T-V_{out-41-17-g}$ with the use of increased current gain. Using the last equation above for $V_{out-41}$ along with the equation above for $R_{w-16}(\theta)$ when electromagnetic radiation pulses are reflected from mark 17 to obtain $E[v_{out-41}]=E[GKR_{w-16}(\theta)]=GKE[R_{w-16}(\theta)]=A_r/r_1$, the resulting noise margin is $$NM_{low-g}=T-GK\frac{A_r}{r_1}.$$

Without increased gain or G=1, the noise margin is $NM_{low-ng}=T-V_{out-41-17-ng}$ giving $$NM_{low-ng}=T-K\frac{A_r}{r_1}.$$

The difference between these two noise margins gives the change in the upper noise margin due to the use of added current gain, or $$NM_{low-g}-NM_{low-ng}=T-GK\frac{A_r}{r_1}-\left(T-K\frac{A_r}{r_1}\right)$$

to yield $$NM_{low-g}-NM_{low-ng}=(1-G)K\frac{A_r}{r_1}.$$

The lower noise margin just as clearly decreases if the current gain multiple exceeds one. However, if low reflectivity mark 17 is very absorbent of the electromagnetic radiation pulses emitted by LED's 11 and 12, the contrast ratio $r_t$ will be large so that the change in the lower noise margin will be negligible. Furthermore, if the painting on surface 15 of mark 17 fills in the defects that the effect of the gain increase on much of the noise will also be negligible so that the lower noise margin will not significantly suffer from the increased gain.

Either of variable current sources 30 and 31 can be represented by the equation $$I_{vcs-30,31}=G(1+\alpha T)(NI_{bit}+I_{ped})$$

for both first and second phase activities in the timing logic signals full cycles, where G=(1+g) is the gain factor controlled by those timing signals through them directing g≠0 and positive during first phases activities for obtaining rotation data, and directing g=0 during second phase activities for obtaining data for adjusting the operating current magnitudes supplied by variable current sources 30 and 31. The factor α is the temperature coefficient for the magnitudes of the current supplied by variable current sources 30 and 31, and T is the environmental temperature in which those sources operate. The factor N is the value of the binary number provided by net accumulators 63 and 64 to the parallel magnitude control inputs of variable current sources 30 and 31, a factor which multiplies the current value differential, $I_{bit}$, chosen to be represented by a change in value of the least significant bit of this number. The pedestal current value is represented by $I_{ped}$.

The independently acting feedback loops for adjusting the magnitudes of the operating current pulses supplied by variable current sources 30 and 31 are dynamically stable, but sufficiently responsive to the relatively slow changes expected for the magnitudes of the operating current pulses supplied thereby. The averaging effects of the counters in the loops damp the responses thereof to changes, and the effective sampling rates are many times the maximum fundamental frequency expected for reflectivity changes due to the rotation rate of eddy wheel 16 which at most is expected to be about 2 revolutions per second. As noted above, the very slow rotation rates do not have data obtained therefor included in the loops adjustment actions.

Figure 5:
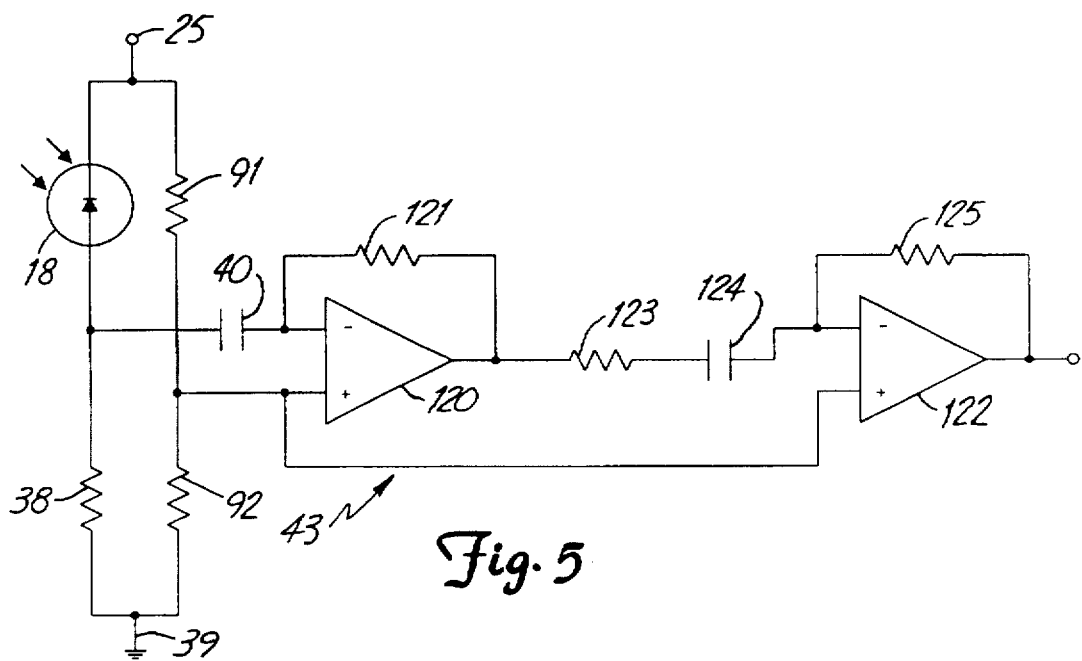
FIG. 5 shows an electrical circuit schematic diagram for an alternative portion of the system of FIG. 2, and FIGS. 6A, 6B and 6C show characteristics of the circuits represented in FIGS. 4 and 5.
Figure 4A:
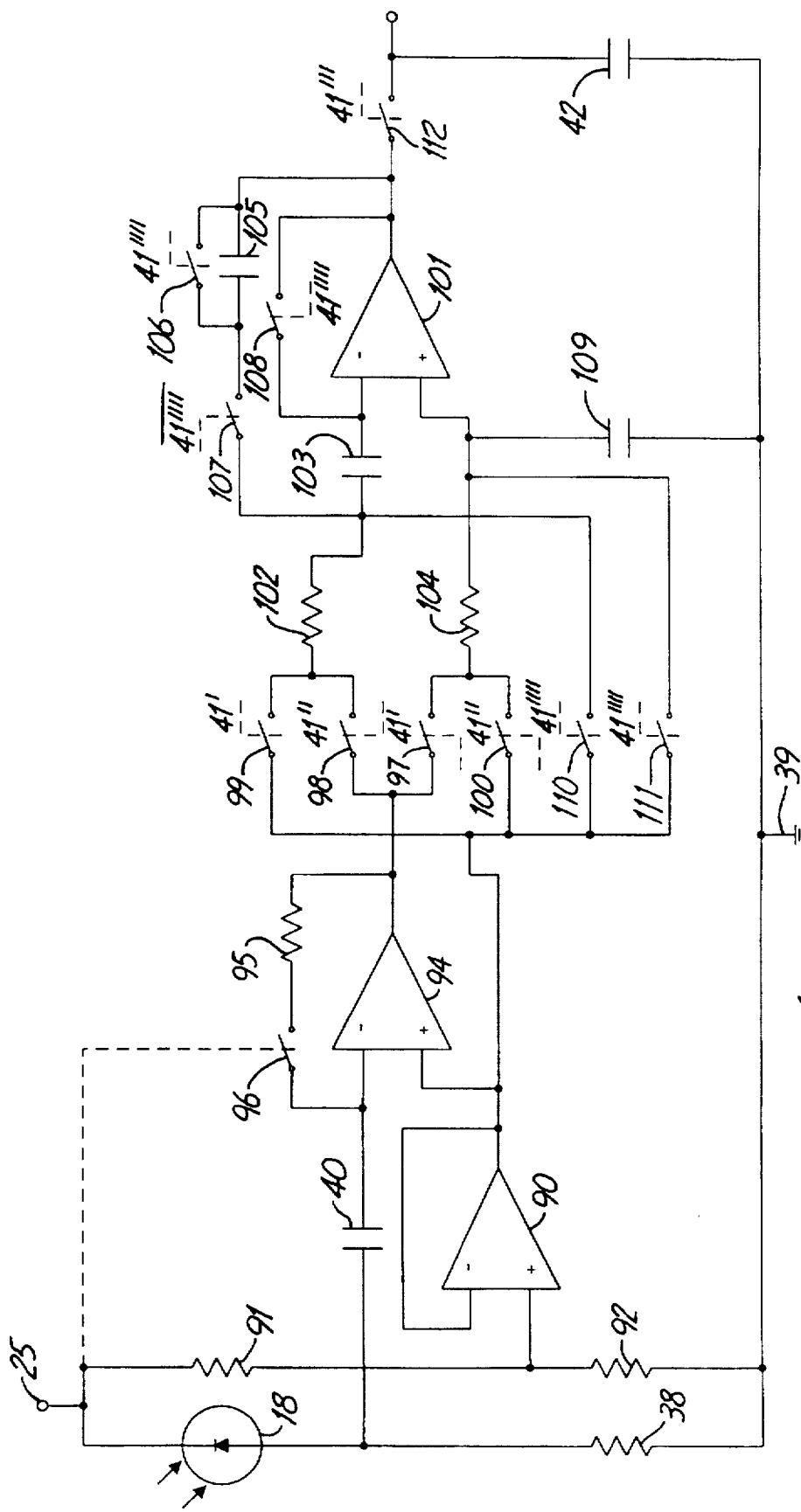

As indicated above, the configurations and characteristics of filters 41 and 43 are further described here in connection with the corresponding circuit schematic diagrams therefor as shown for filter 41 in FIG. 4A and for filter 43 in FIG. 5. The characteristics of each filter will be described by the transfer function for the filtering provided by filter 41, or alternatively, by filter 43, including the passive filtering contribution of resistor 38 and capacitor 40, in the form of an expression representing the Fourier transform of the impulse response therefor, $h_{f-38,40,41;43}(t)$, or $H_{f-38,40,41;43}(\omega)$.

In FIG. 4A, filter 41 operates by first sampling the then current ambient optical background signal represented in the output signal of photodetector 18 corresponding to each LED emission occurrence after passing it through a high-pass filter. The output signal of photodetector 18 is coupled to the input of filter 41 by capacitor 40, and the sampling is directed by timing logic signal 41', as shown in FIGS. 3A and 3B, causing the switching of appropriate switches in that filter for each such LED emission occurrence during the first and second phases of the full cycles of the periodic timing signals. This first sampling in one of these phases due to signal 41', corresponding to a LED emission, occurs just after the initializing current is started by the corresponding one of timing logic signals 32 and 33 but just prior to each activation into conduction of the corresponding one of current sources 30 and 31. Such activation subsequently causes the corresponding one of LED's 11 and 12 to emit an electromagnetic radiation pulse through timing logic signals 34 and 35, respectively, as described above. This relationship can be seen in FIGS. 3A and 3B.

Such preparatory signal samples of the ambient optical background are in effect each subtracted from the corresponding immediately following second signal sample taken of the output signal of photodetector 18 after passing through a high-pass filter during the immediately following corresponding one of the emissions by LED's 11 and 12. This second sampling activity is directed by timing logic signal 41'" shown in FIGS. 3A and 3B, again through these signals causing the switching of appropriate switches in filter 41 during the first and second phases. The subtracting of these first and second sample values effectively cancels the portions of the signal values occurring during those samplings that are unchanged over the short duration between the taking of these successive samples, these signals being due primarily to the optical ambient background. The resulting differences that do occur represent primarily the effects of the emitted electromagnetic radiation pulses after being time integrated that occur during the second sampling.

The value of each of these resulting time integrated differences between the two samplings corresponding to each LED emission is maintained for a short time toward the end of the corresponding radiation pulse emission occurrence in an output hold circuit partially contained in filter 41 and involving capacitor 42 as described above, this holding being directed by timing logic signal 41'" shown in FIGS. 3A and 3B through causing the switching of an appropriate switch in filter 41 during the first and second phases. That is, the storage for this output hold circuit is provided by capacitor 42 connected between the output of filter 41 and ground reference 39 as previously indicated. The resulting voltage pulses form a sequence thereof through corresponding phases in successive periods of full timing logic signal cycles to provide the filter output signal.

In the FIG. 4A schematic for filter 41, photodetector 18, resistor 38 and capacitor 40 have been repeated even though also shown in FIG. 2 since the filtering characteristic between the output from photodetector 18 to holding capacitor 42 is dependent on resistor 38 and capacitor 40. The integrated circuit portion of the system of FIG. 2 is operated from a single polarity power supply and, as a result, a reference voltage is established in filter 41 for the operational amplifiers used therein to operate about so as to effectively be able to have the output signal therefrom to take values that are negative with respect to this reference. These operational amplifiers are typical of such amplifiers, and exhibit the usual characteristics of high gain out to the frequency set by the dominant pole in the transfer function thereof, high input impedance and low output impedance.

This reference voltage just indicated is established by use of an operational amplifier, 90, and a pair of series connected resistors, 91 and 92. Resistors 91 and 92 are connected in series to extend between positive voltage terminal 25 and ground reference terminal 39. Resistor 91 typically has a value of 50 kΩ, and resistor 92 typically has a value of 40 kΩ. The junction of these two resistors is connected to the non-inverting input of operational amplifier 90, and the output of operational amplifier 90 is directly connected to the inverting input thereof to form a unity-gain, reference voltage output amplifier. The desired reference voltage is then supplied at the low impedance output of operational amplifier 90 at approximately the voltage value occurring at the junction of resistors 91 and 92, but as buffered by amplifier 90 so that substantial current can be drawn therefrom without significantly affecting that value.

The signals resulting at the output of the passive component filter formed by resistor 38 and capacitor 40, due to the input signals provided thereto from photodetector 18, are subjected to the high-pass characteristic of that filter and then provided to the input of a signal buffer amplifier based on a further operational amplifier, 94. Operational amplifier 94 has its non-inverting input connected to the reference voltage at the output of operational amplifier 90. The output of operational amplifier 94 is connected through a resistor, 95, in series with a switch, 96, to the inverting input of that operational amplifier. Switch 96 is a single pole, single throw switch and is provided by a transmission gate formed of complementary metal-oxide-semiconductor field-effect transistors (CMOS) in a well known manner. Although switch 96 is provided in the integrated circuit implementation, that switch is always maintained in a closed condition by connecting its control terminal, represented by the dashed line through the switch blade, to positive voltage terminal 25 as is indicated in FIG. 4A. Resistor 95 typically has a value of 50 kΩ.

As a result, operational amplifier 94, having resistor 95 in effect continually connected between its output and its inverting input, along with capacitor 40 and resistor 38 effectively form a buffered high-pass filter (in practice, a bandpass filter due to the dominant pole in the operational amplifier frequency characteristic leading to a filter output magnitude rolloff at higher frequencies) exhibiting gain. The low output impedance of operational amplifier 94 assures that this filter does not have its gain and cutoff frequency affected by the impedances connected to the output thereof that are present in the remainder of the signal path to the output of filter 41.

The output of operational amplifier 94, and so of the high-pass filter arrangement associated therewith, is connected to a pair of further single pole, single throw switches, 97 and 98, also implemented as CMOS transistor based transmission gates. Switch 97 is controlled by logic timing signal 41' shown at its dashed line control terminal in FIG. 4A, and switch 98 is controlled by logic timing signal 41" shown at its dashed line control terminal. Similarly, the output of operational amplifier 90 supplying the reference voltage is further connected to another pair of single pole, single throw switches, 99 and 100, again formed by CMOS transistor base transmission gates. Switch 99 is controlled by logic timing signal 41' shown at its dashed line control terminal in FIG. 4A, and switch 100 is controlled by logic timing 41" signal shown at its dashed line control terminal. Switches 97, 98, 99 and 100 together form a multiplexer under the direction of logic timing signals 41' and 41" to alternately switch the outputs of operational amplifiers 90 and 94 between the two inputs of a further operational amplifier, 101, used in providing a time integrator for signals from this multiplexer.

The outputs of switches 98 and 99 are connected to one another and to one end of a resistor, 102, typically having a value of 50 kΩ. The opposite end of resistor 102 is connected through a capacitor, 103, to the inverting input of operational amplifier 101, this capacitor having a typical value of 10 pF. Similarly, the outputs of switches 97 and 100 are electrically connected together and to one end of a further resistor, 104, also typically being of 50 kΩ in value. The opposite side of resistor 104 is connected to the non-inverting input of operational amplifier 101.

When logic timing signal 41' exhibits a high logic state voltage along with signal 41" exhibiting a low logic state voltage, switches 97 and 99 are closed and switches 98 and 100 are opened to thereby connect the output of operational amplifier 94, and so the signal from photodetector 18, through resistor 104 to the non-inverting input of operational amplifier 101. At the same time, the output of operational amplifier 90 with the reference voltage is connected through resistor 102 and capacitor 103 to the inverting input of operational amplifier 101. Alternatively, when logic timing signal 41" exhibits a high logic state voltage to close switches 98 and 100, and signal 41' exhibits a low logic state voltage so that switches 97 and 99 are open, the output of operational amplifier 94 carrying the signal from photodetector 18 is connected to the inverting input of operational amplifier 101 through resistor 102 and capacitor 103. Concurrently, the output of operational amplifier 90 supplying the reference voltage is connected through resistor 104 to the non-inverting input of operational amplifier 101. Hence, by alternating the occurrences of high logic state voltages in logic timing signals 41' and 41", the outputs of operational amplifiers 90 and 94 can be alternatingly each connected to the opposite one of the inputs of operational amplifier 101.

Operational amplifier 101 has a capacitor, 105, typically with a value of 12 pF, connected between its output and, through a switch, to the junction of resistor 102 and capacitor 103 to form a time integrator operated in conjunction with several single pole, single throw switches implemented as before by CMOS transistor based transmission gates. A first such switch, 106, is connected directly across capacitor 105 to thereby be able to discharge that capacitor when closed. A further switch, 107, already mentioned, is in series with capacitor 105 to allow the completion of the connection of that capacitor between the output of operational amplifier 101 and its inverting input, at least through capacitor 103. Another switch, 108, is connected directly between the output of operational amplifier 101 and its inverting input to allow that operational amplifier to be alternatively connected as a unity-gain amplifier rather than as an integrator. A further capacitor, 109, typically of value 12 pf, is connected from the non-inverting input of operational amplifier 101 to ground terminal 39 to shunt electrical noise to ground, primarily high frequency switching noise. In addition, a switch, 110, is connected from the reference voltage at the output of operational amplifier 90 to the junction of resistor 102 and capacitor 103, and another switch, 111, is connected from this same reference point to the non-inverting input of operational amplifier 101.

Each of switches 106, 107, 108, 110 and 111 are directed by timing logic signal 41'''', although switch 107 is actually directed by the logical complement of that signal, i.e. $\overline{41}''''$. Thus, when logic timing signal 41'''' exhibits a high logic state voltage, switches 106 and 108 are closed but switch 107 is open. In this configuration, capacitor 105 is discharged, and isolated from the inverting input of operational amplifier 101. The closure of switch 108 connects operational amplifier 101 in a unity-gain amplifier configuration to allow "autozeroing" of that amplifier by also closing switches 110 and 111 to connect capacitor 103 across the inputs of that amplifier to be charged to the amplifier offset voltage. Capacitor 103 so charged is then used to remove from the output signal of operational amplifier 101, during the time of integrating of signals applied thereto, the effects of the input offset voltage of that amplifier. This is the configuration maintained in the system by logic signal 41'''' during times that the filter is not in the process of sampling the signals provided by photodetector 18 as can be seen in FIGS. 3A and 3B. In this configuration, capacitor 103 will charge to the full value of the input offset voltage of operational amplifier 101. As a consequence, during sampling, the reversing of the connection of the inputs of operational amplifier 101 to the outputs of operational amplifiers 90 and 94 by the multiplexer results in a cancellation of the offset voltage in each polarity connection to thereby remove its effects from the output signal of operational amplifier 101.

During sampling of signals from the photodetector 18 associated with each LED emission, timing logic signal 41'''' exhibits a low logic state voltage so that switches 106 and 108 are open but switch 107 is closed to thereby have operational amplifier 101 connected in a time integrator configuration. Also during such sampling, timing logic signal 41' first goes to a high logic state voltage while signal 41" stays low, as shown in FIGS. 3A an 3B, in connection with each LED emission episode in a first sampling. This switching results in closing switches 97 and 99 and so connecting the output of operational amplifier 94 carrying the signals of photodetector 18 to the non-inverting input of operational amplifier 101 through resistor 104. The reference voltage from the output of operational amplifier 90 is connected through resistor 102 and capacitor 103 to the inverting input of operational amplifier 101 with the voltage stored on this capacitor canceling the operational amplifier offset voltage. Operational amplifier 101 with capacitor 105 time integrates the difference between these two signals which represents the difference between the ambient optical background sensed by photodetector 18 and the reference voltage, since neither of LED's 11 and 12 would yet be significantly emitting to affect the output of photodetector 18 in this first sampling.

Thereafter, as can be seen in FIGS. 3A and 33B in connection with LED emissions, timing logic signal 41' returns to the low logic state voltage to thereby open switches 97 and 99 while concurrently timing logic signal 41" rises to a high logic state voltage to thereby close switches 98 and 100. This reverses the connections of the outputs of operational amplifiers 90 and 94 by connecting the output of operational amplifier 94 to the inverting input of operational amplifier 101 through resistor 102 and capacitor 103, and connecting the reference voltage at the output of operational amplifier 90 to the non-inverting input of operational amplifier 101 through resistor 104, to begin the second sampling for the corresponding LED emission. The operational amplifier offset voltage is cancelled from the signal by the voltage stored in capacitor 103. Thus, operational amplifier 101 with capacitor 105 begin integrating the signal provided by photodetector 18 in the opposite direction, and do so for the same amount of time during which integration in the first sampling was undertaken. As a result, the ambient optical background is cancelled to the extent that it has not changed between the two integrations. However, during the second integration in the second sampling, sampling occurs with respect to a corresponding one of LED's 11 and 12 by concurrently causing it to emit electromagnetic radiation through being directed to do so by the corresponding one of logic timing signals 34 and 35 as can be seen in FIGS. 3A and 3B. This results in a signal increment, provided by the emission of radiation from one of these LED's, being added to the output signal of photodetector 18 during the time of emission. This signal increment is also integrated during this second integration.

At the point in time in the second sampling that the second integration has continued as long as the first integration during the first sampling, the complement of holding timing logic signal 41''' opens a further switch, 112. This prevents holding capacitor 42 from discharging during the remaining portion of the second integration that exceeds in time that of the first integration, that charge accumulated thereon due to the voltage reached at the output of integrator 101 prior to this opening of switch 112. This signal held on capacitor 42 is then sampled for the threshold detectors as directed by timing logic signal 47, again as indicated in FIGS. 3A and 3B. Upon completion of the remaining portion of the second integration and the holding period, timing logic circuits 41" and 41''' both return to a low logic state voltage while timing logic signal 41'''' again rises to a high logic state voltage to reconnect operational amplifier 101 in a unity-gain amplifier configuration until the occurrence of the next LED emission and its corresponding sampling.

Amplifier 41 of FIG. 4A, as indicated above, is intended to provide substantial attenuation of input signal components changing sufficiently slowly that correspond to sufficiently slow changes in the ambient optical background, some of which changes may be due to common forms of optically based tampering efforts. Thus, this amplifier is capable of substantially attenuating low frequency noise at frequencies below the lower cutoff frequency of the pass band of that amplifier. This noise includes that low frequency noise occurring in the power supply connected between terminals 25 and 39 which leads to a corresponding noise signal occurring at the reference voltage location at the junction of resistors 91 and 92 connected in series with one another between these power supply terminals. However, such attenuation will be much reduced for low frequency noise that is highly correlated with the changing switching states of those switches in amplifier 41 controlling which signals are applied to the inputs of operational amplifier 101 contained in amplifier 41.

A source of such correlated noise in the system of FIG. 2 is the switching on of current sources 30 and 31 periodically to cause periodic emission of light from corresponding light-emitting diodes 11 and 12. During sampling of the optical background at times these current sources and light-emitting diodes are switched off, there will be a certain reference voltage at the junction of resistors 91 and 92 against which the signals from photodetector 18 will be integrated. However, the switching on of these current sources, and so the light-emitting diodes, results in sufficient current being drawn from the power supply to cause a momentary change in the voltage between terminals 25 and 39, and so a corresponding momentary change in the voltage at the junction of resistors 91 and 92. Thus, the sampling of the resulting optical signals during this time diodes 11 and 12 are switched on will lead to an integrating of these signals against a different reference voltage than occurred during sampling in the absence of the emissions from the light-emitting diodes. As a result, effectively, there is correlated noise occurring at the reference voltage location at the junction of resistors 91 and 92, and this correlated noise leads to errors in the output of operational amplifier 101.

Figure 4B:
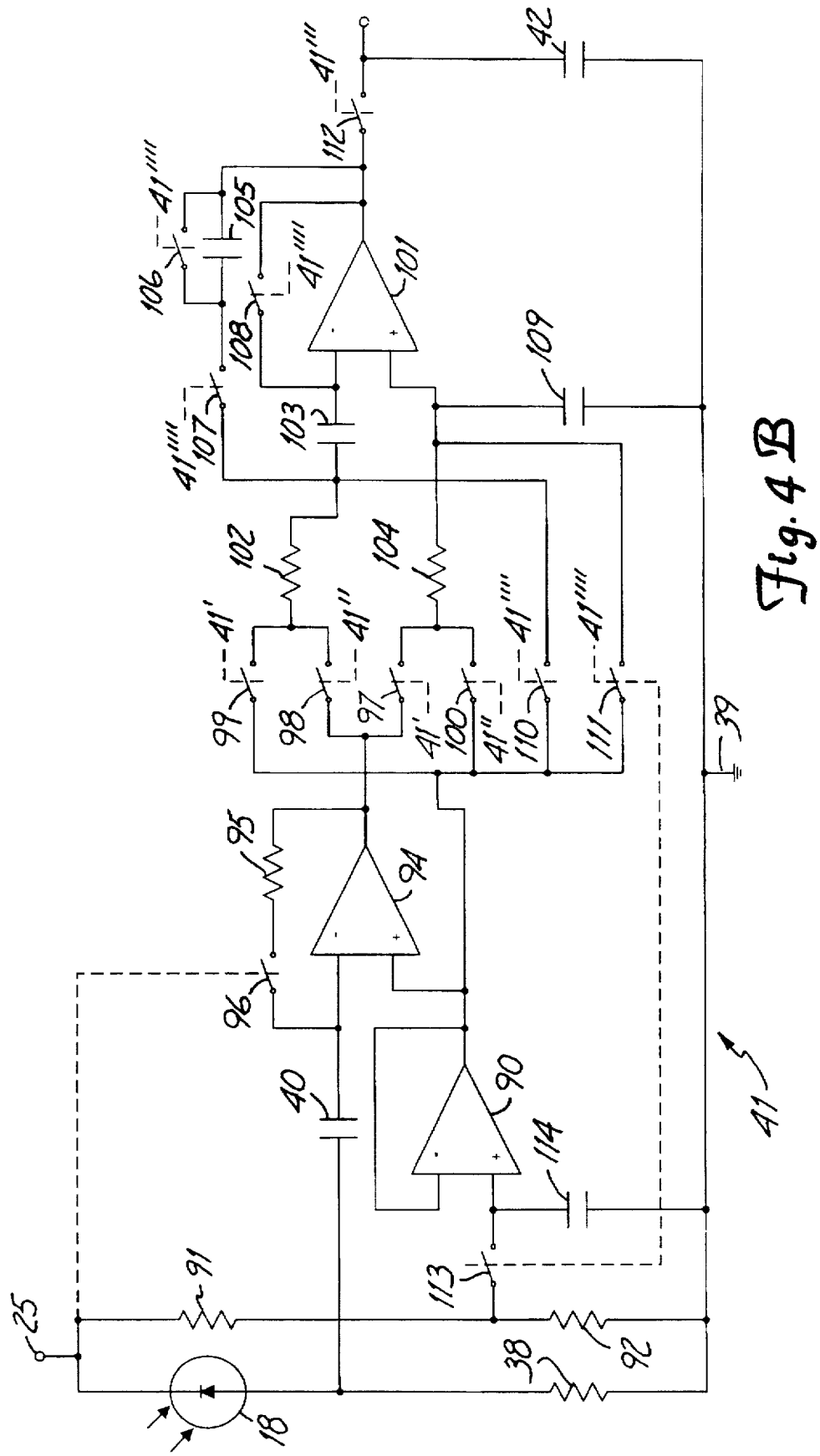

Such a result can be avoided by use of the amplifier circuit shown in the circuit schematic diagram of FIG. 4B. Here, a further switch, 113, is provided between the reference voltage location at the junction of resistors 91 and 92 and the non-inverting input of reference buffer operational amplifier 90. Switch 113 is operated by timing logic signal 41"" so as to be closed during times when sampling of the optical signals is not occurring to provide the basis for maintaining the output of operational amplifier 90 at the reference voltage and for charging a further capacitor, 114, to that reference voltage. Capacitor 114 is connected between the non-inverting input of operational amplifier 90 and ground reference terminal 39.

When, however, sampling of the optical signals does occur, switch 113 is opened so that the reference voltage at the output of operational amplifier 90 is maintained by the reference voltage stored on capacitor 114. Hence, the reference voltage at the output of operational amplifier 90 is no longer subject to shifts in the reference voltage appearing at the juncture of resistors R91 and R92 during the sampling of optical signals at times diodes 11 and 12 are emitting light. Once such sampling is completed, switch 113 is closed by timing logic signal 41"" to again permit the charging of capacitor 114 to the reference voltage appearing at the junction of resistors R91 and R92. Such an arrangement eliminates responses at the outputs of amplifier 41 to such correlated noise. A typical capacitance value for capacitor 114 is 30 pf.

Turning to the schematic diagram of filter 43 in FIG. 5, this diagram also again shows photodetector 18 operated in series with resistor 38 with its output coupled to the inverting input of an operational amplifier, 120, by capacitor 40. Again, a voltage divider to provide a reference voltage is formed by resistors 91 and 92, but the smaller current loading in this circuit allows foregoing the use of a unity-gain reference voltage output amplifier therewith. Instead, the junction of these two resistors is connected to the non-inverting input of operational amplifier 120. A further resistor, 121, is connected from the output of operational amplifier 120 to its inverting input to form a basic single pole, high-pass filter along with resistor 38 and capacitor 40 (again, in practice, a bandpass filter due to the dominant pole in the operational amplifier frequency characteristic) like that provided by operational amplifier 94 in filter 41. Resistor 121 typically has a value of 50 kΩ.

An identical second high-pass filter is connected to the output of operational amplifier 120, and the high-pass filter of which it is a part, so that these two single pole filters are cascaded together provide a high-pass filter having a pair of repeated poles in the transfer function thereof providing the transfer function for filter 43. This second high-pass filter is based on another operational amplifier, 122, having its non-inverting input also connected to the junction of resistors 91 and 92. The inverting input thereof is connected through a series combination of a resistor, 123, and a capacitor, 124, to the output of operational amplifier 120. A further resistor, 125, typically with a 50 kΩ value, is connected between the output of operational amplifier 122 and its inverting input to again form a high-pass filter with resistor 123 and capacitor 124. Resistor 123 typically has a value of 3.4 kΩ and capacitor 124 typically has a value of 0.1 μF.

The behavior across frequency of either of the two high-pass filter sections forming filter 43 can be obtained by using the impedance in the frequency domain of the feedback components therein, either resistors 121 or 125, and the series impedance in the frequency domain of the corresponding set of input components, either resistor 38 and capacitor 40 in one set or resistor 123 and capacitor 124 in the other. The ratio of these impedances appropriate for the FIG. 5 inverting amplifier arrangement for these filter sections, with the simplifying assumption of the reference voltage being zero and the operational amplifier offset voltages being insignificant, gives the result effectively for the Fourier transform of the impulse response for the first operational amplifier filter section, $H_{43-l_n}(\omega)$, as $$H_{43-1}(\omega) = -\frac{R_{121}}{R_{38} + \frac{1}{j\omega C_{40}}} = -\frac{j\omega R_{121}C_{40}}{j\omega R_{38}C_{40} + 1}.$$

The presence of a dominant pole in the transfer function representing the frequency characteristic of the operational amplifiers can be well approximated by multiplying this last result by a factor containing a further single pole having a break frequency set at the upper transition frequency for the passband of this filter section, $f_{3db}$, to give $$H_{43-1} = -\frac{j\omega R_{121}C_{40}}{j\omega R_{38}C_{40}+1} \quad \frac{1}{\frac{j\omega}{2\pi f_{3db}}+1} =$$

$$-\frac{j\omega R_{121}C_{40}}{j\omega R_{38}C_{40}+1} \quad \frac{2\pi f_{3db}}{j\omega + 2\pi f_{3db}}.$$

The Fourier transform of the impulse response for the second operational amplifier high-pass filter section in filter 43, $H_{43-2}(\omega)$, will be the same as that just given for the first operational amplifier high-pass filter in view of their substantially identical construction. Thus, the frequency characteristic for the entirety of filter 43, as is well known, will be found from multiplying the Fourier transforms of the two impulse responses which, in view of this substantial identicality, will be the square of either one of them, or $$H_{43}(\omega) = \left[ \frac{j\omega R_{121,125}C_{40,124}}{j\omega R_{38,123}C_{40,124}+1} \quad \frac{2\pi f_{3db}}{j\omega + 2\pi f_{3db}} \right]^2.$$

Filter 41 in FIGS. 4A and 4B have the same configuration for the feedback impedance about, and the set of input impedance components connected to the input of, operational amplifier 94 as do the operational amplifiers in filter 43. Thus, this arrangement for operational amplifier 94 provides a high-pass filter serving as the first signal processing section of filter 41 that is substantially identical to that of the two high-pass filter sections in filter 43 as can be seen in FIG. 5. Hence, the Fourier transform of this input high-pass filter based on operational amplifier 94 can be expressed in the same form as was used for the high-pass filter sections of filter 43, or $$H_{41-1}(\omega) = -\frac{j\omega R_{95}C_{40}}{j\omega R_{38}C_{40}+1} \quad \frac{2\pi f_{3db}}{j\omega + 2\pi f_{3db}}.$$

The output of this first high-pass filter section based on operational amplifier 94 is applied through an analog multiplexer, i.e. switches 97, 98, 99 and 100, in the second section of filter 41 to the inputs of a differential time integrator based on operational amplifier 101 during each of the two sampling periods associated with each LED emission when the signals from the output of operational amplifier 94 are being integrated in that integrator.

Since the capacitors involved with operational amplifier 101 are cleared during times other than sampling times, the impulse response of the multiplexer and the integrator can be considered to be confined in time to the two sampling periods each of duration T. Thus, this impulse response for the ambient optical background comprises the negative of the impulse response of an integrator during the portion of the sampling period when signal 41' is in a high voltage logic state, and the impulse response of an integrator during the subsequent portion of the sampling period when logic timing signal 41" exhibits a high logic state voltage prior to the complement of logic timing signal 41'" opening switch 112 after which the action of the integrator in that sampling period no longer matters for the current samplings. As the impulse response of an integrator is well known to be a unit step function, u(t), during the time in which the integrator is being used to integrate signals over time, a composite impulse response for the integrator and multiplexer of filter 41 during the two samplings of the optical ambient background associated with a LED emission can be taken as (a) a negative square pulse during the occurrence of a high logic state voltage in signal 41' lasting for time T, followed by (b) a positive square pulse lasting for the same duration T, and assume that effectively the sampling occurs after such integration. The magnitudes for these square pulses forming this composite impulse response are set by the integrator time constant. The integrator time constant is the reciprocal of the product $R_{102,104}C_{105}$, and so the composite impulse function for responding to ambient optical background signals from the output of operational amplifier 94 becomes $$h_{41-2amb}(t) = -\frac{1}{R_{102,104}C_{105}} [-u(t+T)+u(t)][u(t)-u(t-T)]$$

$$= -\frac{1}{R_{102,106}C_{105}} [-u(t+T)+2u(t)-u(t-T)]$$

again taking the reference voltage as zero to simplify the result and noting the cancellation as described above of the offset voltage of operational amplifier 101.

The impulse response of the multiplexer and the integrator to the LED emission based signal from photodetector 18 occurs just during the time that logic timing signal 41" exhibits a high logic state voltage prior to the high logic state voltage subsequently occurring in logic timing signal 41'", i.e. just during the second sampling. As a result, there is a different effective impulse response faced by signals resulting from the emission of electromagnetic radiation by either of LED's 11 and 12 than is faced by the ambient optical background in this integrator, and this impulse response during such emissions is just that which occurs for the optical ambient background during the second part of the sampling when logic timing signal 41" exhibits a high logic state voltage. This yields an impulse response for the integrator with respect to photodetector 18 LED based signals of a positive excursion square wave pulse scaled by the reciprocal of the integrator time constant given above, or $$h_{41-2sig}(t) = -\frac{1}{R_{102,104}C_{105}} [u(t)-u(t-T)]$$

assuming the same reference voltage value and offset conditions. This providing in the filter second section of a different impulse response for the optical ambient background signals from the photodetector versus the impulse response for photodetector signals based on emissions from either of LED's 11 and 12, due to the resulting cancellation of the unchanged portions of the ambient optical background signals in the two samplings thereof, results in a higher gain for such LED based photodetector signals in filter 41 as compared to filter 43 but a lower gain for the ambient optical background photodetector signals in filter 41 as compared to filter 43.

To demonstrate this result, the Fourier transforms must be obtained for these two impulse responses provided by filter 41 and compared with the Fourier transform of the impulse response obtained from filter 43 above. The Fourier transform of the optical ambient background filter section second impulse response is found to be $$H'_{41-2amb}(\omega) = -j\frac{2[\cos(\omega T)-1]}{\omega R_{102,104}C_{105}}.$$

A good approximation can be made here too for the dominant pole in the transfer function for operational amplifier 101 providing the frequency characteristic thereof by introducing an additional simple pole in the foregoing equation with the break frequency at the upper frequency transition in the passband of the filter to give $$H_{41-2amb}(\omega) = -j \frac{2|\cos(\omega T)-1|}{\omega R_{102,104}C_{105}} \frac{2\pi f_{3db}}{j\omega + 2\pi f_{3db}}.$$

The Fourier transform of the filter second section impulse response $H_{43-2sig}(\omega)$ for the LED emission based photodetector 18 signal, after introducing the added single pole due to the dominant pole in the operational amplifier transfer characteristic, is found to be $$H_{41-2sig}(\omega) = -2e^{-\frac{j\omega T}{2}} \frac{\sin\frac{\omega T}{2}}{\omega R_{102,104}C_{105}} \frac{2\pi f_{2d}}{j\omega + 2\pi f_{3db}}.$$

These Fourier transforms of the impulse responses of the multiplexer and the integrator in the second section of filter 41, for the optical ambient background and the LED emission based photodetector 18 signal, must each be multiplied by the Fourier transform of the impulse response for the high-pass filter in the first section of that filter 41 to provide the overall transform expressions for filter 41. Doing so provides the following expressions for the frequency characteristics of filter 41 for both optical ambient background signals and LED signals. These are $$H_{41-amb}(\omega) = \frac{j\omega R_{95}C_{40}}{j\omega R_{38}C_{40}+1} \frac{2j[\cos(\omega T)-1]}{\omega R_{102,104}C_{105}} \left(\frac{2\pi f_{3db}}{j\omega + 2\pi f_{3db}}\right)^2$$

and $$H_{41-sig}(\omega) = \frac{j\omega R_{95}C_{40}}{j\omega R_{38}C_{40}+1} 2e^{-\frac{j\omega T}{2}} \frac{\sin\frac{\omega T}{2}}{\omega R_{102,104}C_{105}} \left(\frac{2\pi f_{3db}}{j\omega + 2\pi f_{3db}}\right)^2.$$

Figure 6A:
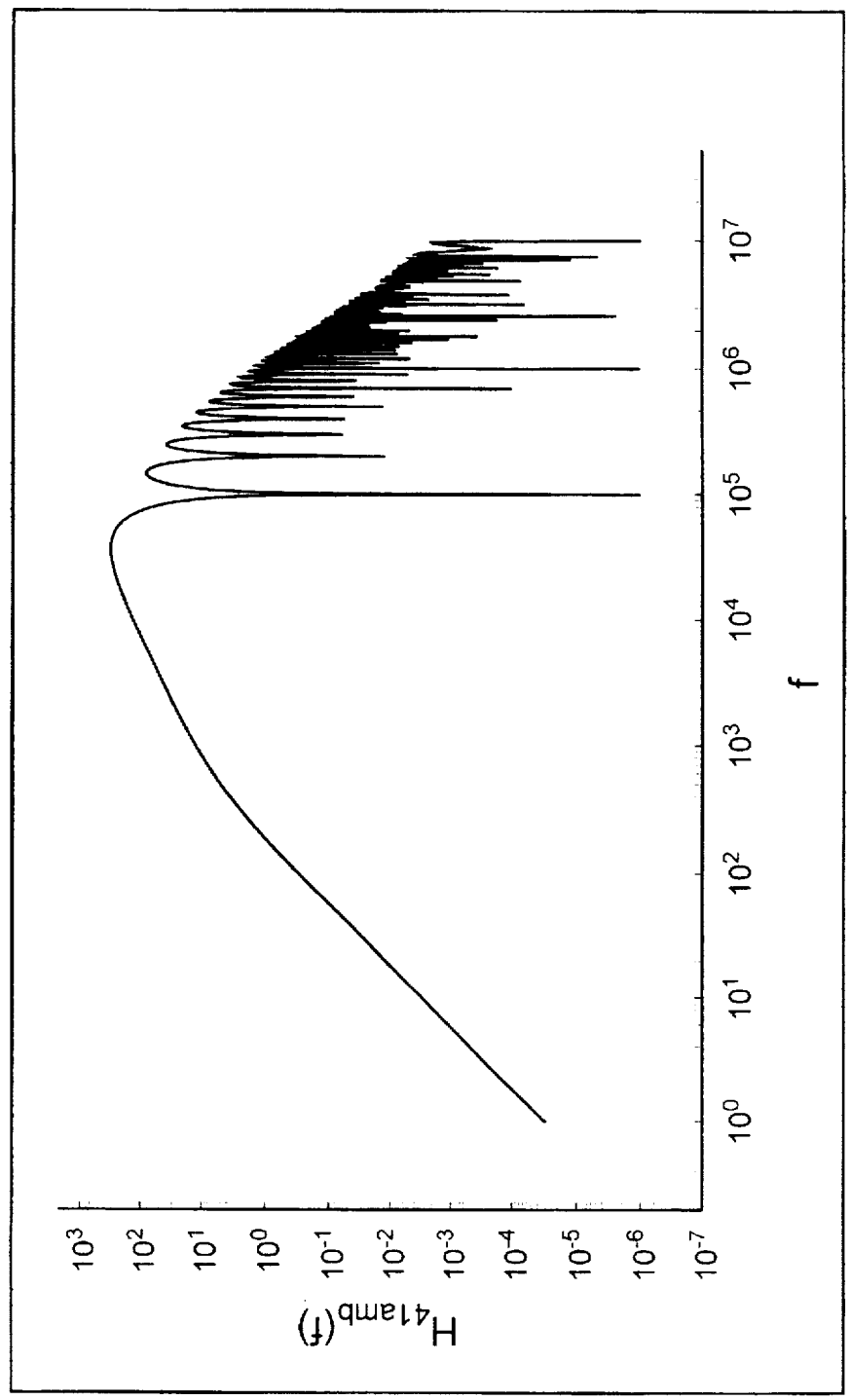
Figure 6B:
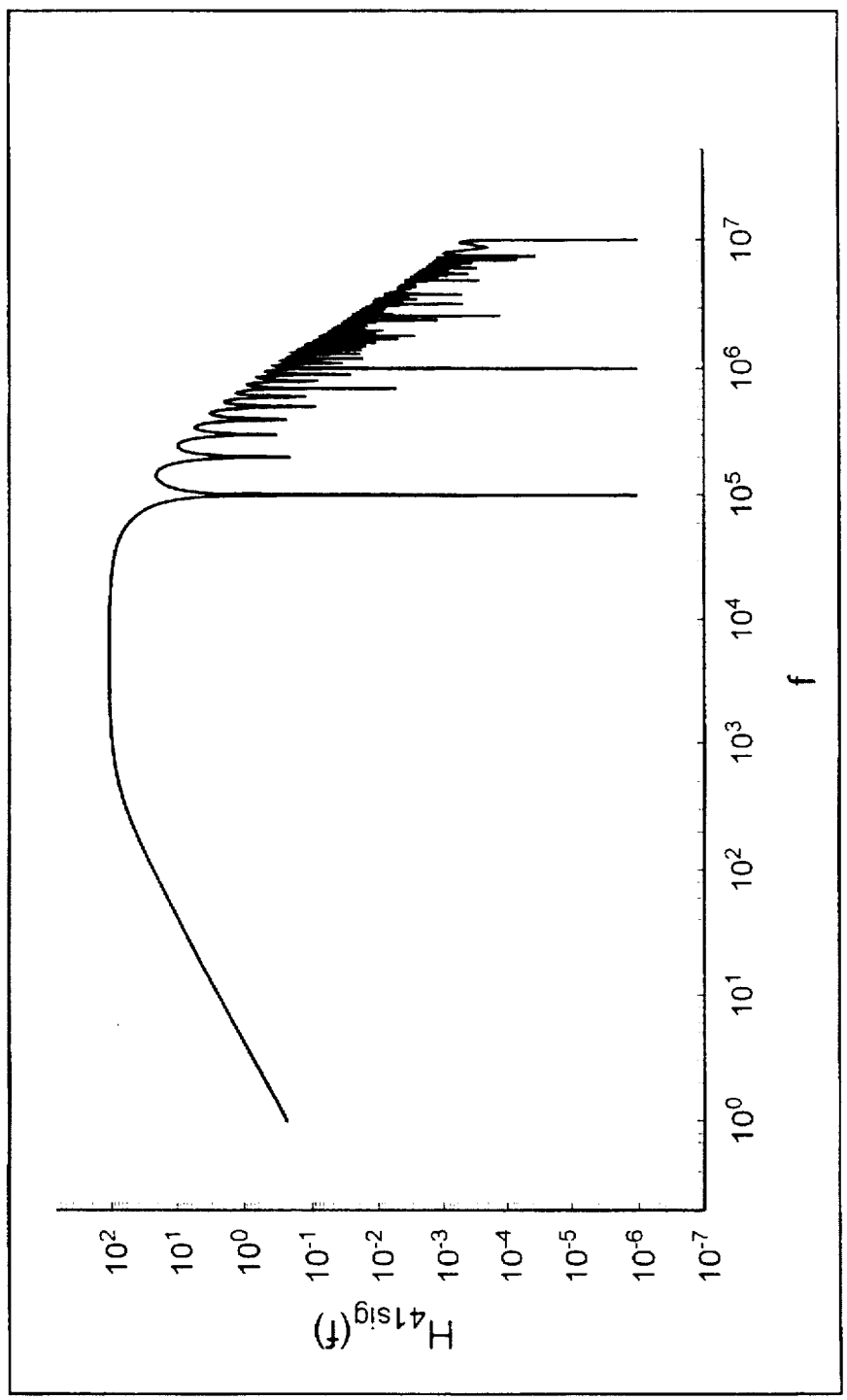
Figure 6C:
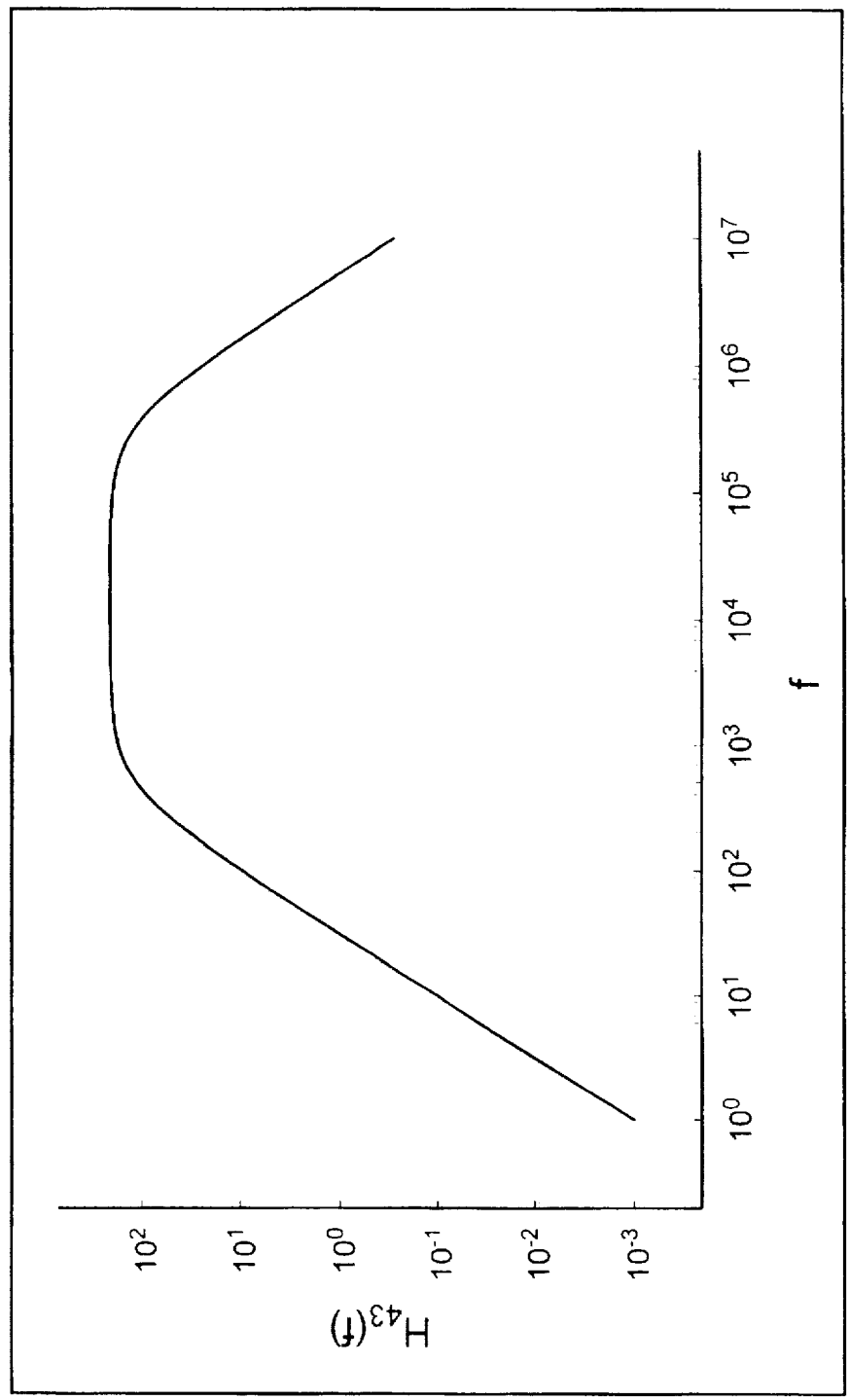

The graphs of these frequency characteristics versus frequency are shown in FIG. 6A, 6B and 6C and, in comparison with one another, show the result stated above. At lower frequencies, FIG. 6C, showing the frequency characteristic of external filter 43, indicates the attenuation provided thereby is less than that which provided for ambient optical background signals in correlated double sample integrator based filter 41 when compared with the frequency characteristic for this latter filter with respect to ambient optical background signals that is shown in FIG. 6A. Yet FIG. 6C indicates the attenuation provided by external filter 43 at these same lower frequencies is greater than that which provided for LED based signals by filter 41 when compared with the frequency characteristic for this latter filter with respect to LED based signals that is shown in FIG. 6B.

Although the present invention has been described with reference to preferred embodiments, workers skilled in the art will recognize that changes may be made in form and detail without departing from the spirit and scope of the invention.

What is claimed is:

1. An active filter having a frequency characteristic for signals from a selected controlled signal source differing from its frequency characteristic for signals from background sources at low frequencies, and having an input electrically connected to said sources and an output, said filter comprising:

an input filter having an input serving as said active filter input and an output, said input filter acting to attenuate low input signal frequencies relatively more than some selected higher input signal frequencies;

an analog multiplexer having a first signal input electrically connected to said input filter output, a second signal input electrically connected to a terminating region for receiving a reference voltage, a control input for receiving control signals, and further having a first output at which signals on a selected one of said first and second multiplexer signal inputs can be directed to appear by control signals provided at said control input, said control signals also controlling said selected controlled signal source to provide output signals to said active filter input only when said multiplexer has signals appearing at said output thereof from a selected one of said first and second signal inputs thereof, and an integrator having a first input electrically connected to said multiplexer output and having an output, said integrator effectively providing at said output thereof time integrated versions of signals appearing at said first input thereof.

2. The apparatus of claim 1 wherein said analog multiplexer has a second output at which signals appear from that one of said first and second signals inputs thereof opposite that one thereof having signals appear at said first multiplexer output, and wherein said integrator has a second input electrically connected to said multiplexer second output with said integrator effectively providing at said output thereof time integrated versions of a signal representing differences between signals appearing at said first and second inputs thereof.

3. The apparatus of claim 1 wherein said analog multiplexer second signal input is also electrically connected to a reference voltage value memory device and is electrically connected to said terminating region suited for electrical connection to a source of reference voltage through a reference voltage switch that permits selectively communicating any voltage occurring on said terminating region to said reference voltage value memory device.

4. The apparatus of claim 2 wherein said input filter and said integrator are each based on a corresponding operational amplifier exhibiting a breakpoint in its frequency response representing relatively greater attenuation in its output signal at selected higher frequencies in input signals provided thereto.

5. The apparatus of claim 2 wherein said input filter has a single pole in its transfer function.

6. The apparatus of claim 2 wherein said analog multiplexer second signal input is also electrically connected to a reference voltage value memory device and is electrically connected to said terminating region suited for electrical connection to a source of reference voltage through a reference voltage switch that permits selectively communicating any voltage occurring on said terminating region to said reference voltage value memory device.

* * * * *

UNITED STATES PATENT AND TRADEMARK OFFICE
CERTIFICATE OF CORRECTION

PATENT NO. : 5,798,670
DATED : AUGUST 25, 1998
INVENTOR(S) : THOMAS A. LEE

It is certified that error appears in the above-identified patent and that said Letters Patent is hereby corrected as shown below:

Col. 19, line 60, after "that", and before "the", insert
--surface of eddy wheel 17 to substantially reduce the variation in the reflectivity,--

Signed and Sealed this

Twenty-first Day of September, 1999

*Attest:*

Q. TODD DICKINSON

*Attesting Officer*   Acting Commissioner of Patents and Trademarks